US012435956B2

(12) United States Patent
Nerheim et al.

(10) Patent No.: US 12,435,956 B2
(45) Date of Patent: Oct. 7, 2025

(54) METHODS AND APPARATUS FOR A HIGH VOLTAGE CIRCUIT

(71) Applicant: Axon Enterprise, Inc., Scottsdale, AZ (US)

(72) Inventors: Magne H. Nerheim, Paradise Valley, AZ (US); Varun Sathyanarayan, Phoenix, AZ (US); Ryan Markle, Phoenix, AZ (US)

(73) Assignee: Axon Enterprise, Inc., Scottsdale, AZ (US)

( * ) Notice: Subject to any disclaimer, the term of this patent is extended or adjusted under 35 U.S.C. 154(b) by 0 days.

(21) Appl. No.: 18/759,289

(22) Filed: Jun. 28, 2024

(65) Prior Publication Data

US 2024/0353206 A1  Oct. 24, 2024

Related U.S. Application Data

(63) Continuation of application No. 17/720,633, filed on Apr. 14, 2022, now Pat. No. 12,025,409.

(60) Provisional application No. 63/175,422, filed on Apr. 15, 2021.

(51) Int. Cl.
| | |
|---|---|
| *F41H 13/00* | (2006.01) |
| *H02J 7/00* | (2006.01) |
| *H05C 1/02* | (2006.01) |
| *H05C 1/04* | (2006.01) |

(52) U.S. Cl.
CPC ........ *F41H 13/0025* (2013.01); *H02J 7/0044* (2013.01); *H05C 1/02* (2013.01); *H05C 1/04* (2013.01)

(58) Field of Classification Search
CPC ...... H02J 7/044; H02J 7/0063; H02J 2207/50; H05C 1/02; H05C 1/04; F41H 13/0025

USPC ......................................................... 361/232
See application file for complete search history.

(56) References Cited

U.S. PATENT DOCUMENTS

| | | | |
|---|---|---|---|
| 8,558,586 B1 * | 10/2013 | Martin ............... | H03K 17/6871 |
| | | | 327/108 |
| 9,903,690 B1 * | 2/2018 | Nerheim ............... | G01R 17/02 |
| 10,627,195 B2 | 4/2020 | Nerheim et al. | |
| 2002/0179077 A1 | 12/2002 | Juan | |

(Continued)

FOREIGN PATENT DOCUMENTS

| | | | |
|---|---|---|---|
| CN | 212543380 U | 2/2021 | |
| TW | M300942 U | 11/2006 | |
| WO | WO-2019157359 A1 * | 8/2019 | ......... A61B 18/1206 |

OTHER PUBLICATIONS

Korean Intellectual Property Office, International Search Report for international Application No. PCT/US2022/024769 mailed Aug. 9, 2022.

(Continued)

*Primary Examiner* — Kevin J Comber
(74) *Attorney, Agent, or Firm* — Andrew Graham

(57) ABSTRACT

A conducted electrical weapon ("CEW") comprises one or more switch devices and a charge storage circuit for delivering a stimulus signal via a deployed electrode. A charge may be stored in the charge storage circuit. A first switch device of the one or more switch devices may be selectively turned on according to the charge of the charge storage circuit. The stimulus signal may be delivered via a current flow path comprising the first switch device and the deployed electrode according to the charge of the charge storage circuit.

20 Claims, 7 Drawing Sheets

(56) References Cited

U.S. PATENT DOCUMENTS

| | | |
|---|---|---|
| 2008/0130192 A1 | 6/2008 | Nerheim |
| 2014/0098453 A1 | 4/2014 | Brundula et al. |
| 2017/0241753 A1* | 8/2017 | Nerheim ............ F41H 13/0018 |
| 2019/0041171 A1* | 2/2019 | Nerheim ............ F41H 13/0025 |
| 2021/0080231 A1 | 3/2021 | Nerheim |

OTHER PUBLICATIONS

Taiwan IPO, Search Report for Taiwanese Application No. 111114447 completed Mar. 7, 2023.
European Patent Office, Extended European Search Report for European Application No. 22788918.5, mailed Feb. 7, 2025.

* cited by examiner

METHODS AND APPARATUS FOR A HIGH VOLTAGE CIRCUIT

FIELD OF INVENTION

Embodiments of the present invention relate to a conducted electrical weapon ("CEW") (e.g., electronic control device) that launches electrodes to provide a stimulus signal through a human or animal target to impede locomotion of the target.

BRIEF DESCRIPTION OF THE SEVERAL VIEWS OF THE DRAWING

Embodiments of the present invention will be described with reference to the drawing, wherein like designations denote like elements, and.

DETAILED DESCRIPTION OF INVENTION

Figure 1:
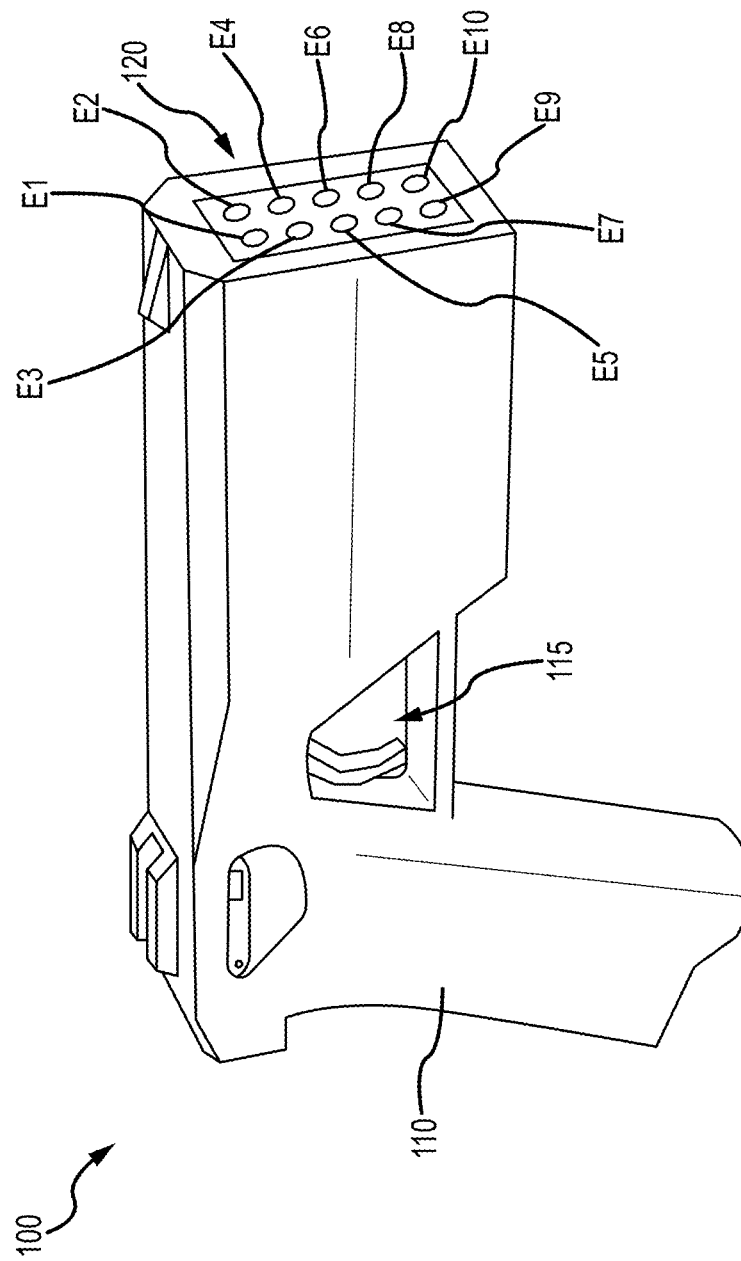
FIG. 1 is a perspective view of a conducted electrical weapon ("CEW"), in accordance with various embodiments.

The detailed description of exemplary embodiments herein makes reference to the accompanying drawings, which show exemplary embodiments by way of illustration. While these embodiments are described in sufficient detail to enable those skilled in the art to practice the disclosures, it should be understood that other embodiments may be realized and that logical changes and adaptations in design and construction may be made in accordance with this disclosure and the teachings herein. Thus, the detailed description herein is presented for purposes of illustration only and not of limitation.

The scope of the disclosure is defined by the appended claims and their legal equivalents rather than by merely the examples described. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, coupled, connected, or the like may include permanent, removable, temporary, partial, full, and/or any other possible attachment option. Additionally, any reference to without contact (or similar phrases) may also include reduced contact or minimal contact. Surface shading lines may be used throughout the figures to denote different parts but not necessarily to denote the same or different materials.

Systems, methods, and apparatuses may be used to interfere with voluntary locomotion (e.g., walking, running, moving, etc.) of a target. For example, a CEW may be used to deliver a stimulus signal through tissue of a human or animal target. Although typically referred to as a conducted electrical weapon, as described herein a "CEW" may refer to a conducted electrical weapon, a conducted energy weapon, and/or any other similar device or apparatus configured to provide a stimulus signal through one or more deployed projectiles (e.g., electrodes).

A stimulus signal carries a charge into target tissue. The stimulus signal may interfere with voluntary locomotion of the target. The stimulus signal may cause pain. The pain may also function to encourage the target to stop moving. The stimulus signal may cause skeletal muscles of the target to become stiff (e.g., lock up, freeze, etc.). The stiffening of the muscles in response to a stimulus signal may be referred to as neuromuscular incapacitation ("NMI"). NMI disrupts voluntary control of the muscles of the target. The inability of the target to control its muscles interferes with locomotion of the target.

A stimulus signal may be delivered through the target via terminals coupled to the CEW. Delivery via terminals may be referred to as a local delivery (e.g., a local stun, a drive stun, etc.). During local delivery, the terminals are brought close to the target by positioning the CEW proximate to the target. The stimulus signal is delivered through the target's tissue via the terminals. To provide local delivery, the user of the CEW is generally within arm's reach of the target and brings the terminals of the CEW into contact with or proximate to the target.

A stimulus signal may be delivered through the target via one or more (typically at least two) wire-tethered electrodes. Delivery via wire-tethered electrodes may be referred to as a remote delivery (e.g., a remote stun). During a remote delivery, the CEW may be separated from the target up to the length (e.g., 15 feet, 20 feet, 30 feet, etc.) of the wire tether. The CEW launches the electrodes towards the target. As the electrodes travel toward the target, the respective wire tethers deploy behind the electrodes. The wire tether electrically couples the CEW to the electrode. The electrode may electrically couple to the target thereby coupling the CEW to the target. In response to the electrodes connecting with, impacting on, or being positioned proximate to the target's tissue, current of the stimulus signal may be provided through the target via the electrodes (e.g., a circuit is formed through the first tether and the first electrode, the target's tissue, and the second electrode and the second tether).

Terminals or electrodes that contact or are proximate to the target's tissue deliver the stimulus signal through the target. Contact of a terminal or electrode with the target's tissue establishes an electrical coupling (e.g., circuit) with the target's tissue. Electrodes may include a spear that may pierce the target's tissue to contact the target.

In various embodiments, a signal generator of the CEW may provide the stimulus signal at a low voltage (e.g., less than 2,000 volts). The low voltage stimulus signal may not ionize the air in the clothing or the air in the gap that separates the terminal or electrode from the target's tissue. A CEW having a signal generator providing stimulus signals at only a low voltage (e.g., a low voltage signal generator) may require deployed electrodes to be electrically coupled to the target by contact (e.g., touching, spear embedded into tissue, etc.).

A CEW may include at least two terminals at the face of the CEW. A CEW may include two terminals for each bay that accepts a cartridge (e.g., deployment unit). The terminals are spaced apart from each other.

The likelihood that the stimulus signal will cause NMI increases when the electrodes that deliver the stimulus signal are spaced apart at least 6 inches (15.24 centimeters) so that the current from the stimulus signal flows through the at least 6 inches of the target's tissue. In various embodiments, the electrodes preferably should be spaced apart at least 12 inches (30.48 centimeters) on the target. Because the terminals on a CEW are typically less than 6 inches apart, a stimulus signal delivered through the target's tissue via terminals likely will not cause NMI, only pain.

A series of pulses may include two or more pulses separated in time. Each pulse delivers an amount of charge into the target's tissue. In response to the electrodes being appropriately spaced (as discussed above), the likelihood of inducing NMI increases as each pulse delivers an amount of charge in the range of 55 microcoulombs to 71 microcoulombs per pulse. The likelihood of inducing NMI increases when the rate of pulse delivery (e.g., rate, pulse rate, repetition rate, etc.) is between 11 pulses per second ("pps") and 50 pps. Pulses delivered at a higher rate may provide less charge per pulse to induce NMI. Pulses that deliver more charge per pulse may be delivered at a lesser rate to induce NMI. In various embodiments, a CEW may be hand-held and use batteries to provide the pulses of the stimulus signal. In response to the amount of charge per pulse being high and the pulse rate being high, the CEW may use more energy than is needed to induce NMI. Using more energy than is needed depletes batteries more quickly.

Empirical testing has shown that the power of the battery may be conserved with a high likelihood of causing NMI in response to the pulse rate being less than 44 pps and the charge per a pulse being about 63 microcoulombs. Empirical testing has shown that a pulse rate of 22 pps and 63 microcoulombs per a pulse via a pair of electrodes will induce NMI when the electrode spacing is at least 12 inches (30.48 centimeters).

In various embodiments, a CEW may include a handle and one or more cartridges (e.g., deployment units). The handle may include one or more bays for receiving one or more cartridges 120. For example, the bay may be configured to receive a single cartridge, two cartridges, three cartridges, nine cartridges, or any other number of cartridges. Each cartridge may be removably positioned in (e.g., inserted into, coupled to, etc.) a bay. Each cartridge may releasably electrically, electronically, and/or mechanically couple to a bay.

In various embodiments, a cartridge may include two or more electrodes that are launched at the same time. In various embodiments, a cartridge may include two or more electrodes that may be launched individually at separate times. Launching the electrodes may be referred to as activating (e.g., firing) a cartridge. After use (e.g., activation, firing), a cartridge may be removed from the bay and replaced with an unused (e.g., not fired, not activated) cartridge to permit launch of additional electrodes. A deployment of the CEW may launch one or more electrodes toward a target to remotely deliver the stimulus signal through the target.

Figure 2:
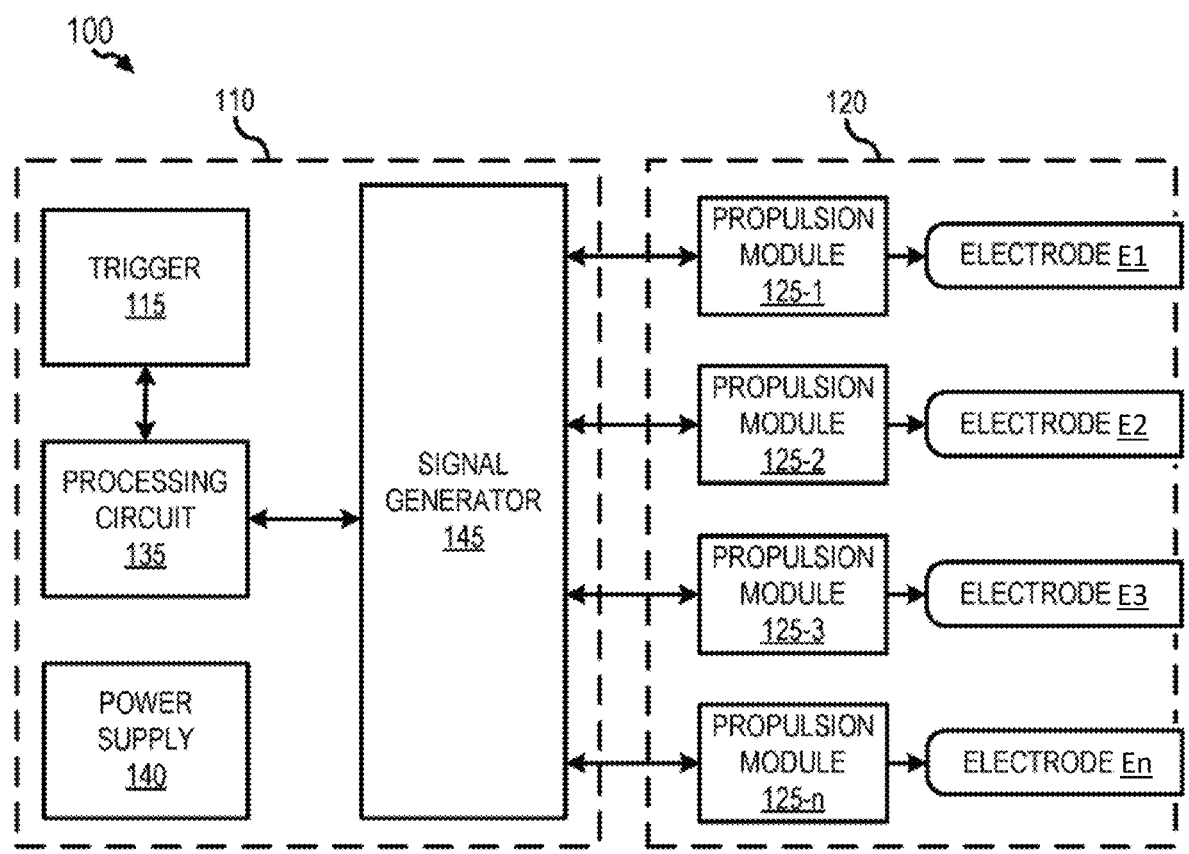
FIG. 2 is a schematic view of the CEW, in accordance with various embodiments.

In various embodiments, and with reference to FIGS. 1 and 2, a CEW 100 is disclosed. The CEW 100 may be similar to, or have similar aspects and/or components with, any CEW discussed herein. The CEW 100 may comprise a housing 110 and one or more cartridges 120 (e.g., deployment units). It should be understood by one skilled in the art that FIG. 2 is a schematic representation of the CEW 100, and one or more of the components of the CEW 100 may be located in any suitable position within, or external to, the housing 110.

The housing 110 may be configured to house various components of the CEW 100 that are configured to enable deployment of the cartridges 120, provide an electrical current to cartridges 120, and otherwise aid in the operation of the CEW 100, as discussed further herein. Although depicted as a firearm in FIG. 1, the housing 110 may comprise any suitable shape and/or size. The housing 110 may comprise a handle end opposite a deployment end. The deployment end may be configured, and sized and shaped, to receive one or more cartridges 120. The handle end may be sized and shaped to be held in a hand of a user. For example, the handle end may be shaped as a handle to enable hand-operation of the CEW 100 by a user. In various embodiments, the handle end may also comprise contours shaped to fit the hand of a user, for example, an ergonomic grip. The handle end may include a surface coating, such as, for example, a non-slip surface, a grip pad, a rubber texture, and/or the like. As a further example, the handle end may be wrapped in leather, a colored print, and/or any other suitable material, as desired.

In various embodiments, the housing 110 may comprise various mechanical, electronic, and/or electrical components configured to aid in performing the functions of the CEW 100. For example, the housing 110 may comprise one or more triggers 115, control interfaces, processing circuits 135, power supplies 140, and/or signal generators 145. The housing 110 may further comprise a guard (e.g., trigger guard). The guard may define an opening formed in the housing 110. The guard may be located on a center region of the housing 110 (e.g., as depicted in FIG. 1), and/or in any other suitable location on housing 110. A trigger 115 may be disposed within the guard. The guard may be configured to protect the trigger 115 from unintentional physical contact (e.g., an unintentional activation of the trigger 115). The guard may surround the trigger 115 within the housing 110.

In various embodiments, the trigger 115 may be coupled to an outer surface of the housing 110, and may be configured to move, slide, rotate, or otherwise become physically depressed or moved upon application of physical contact. For example, the trigger 115 may be actuated by physical contact applied to the trigger 115 from within the guard. The trigger 115 may comprise a mechanical or electromechanical switch, button, trigger, or the like. For example, the trigger 115 may comprise a switch, a pushbutton, and/or any other suitable type of trigger. The trigger 115 may be mechanically and/or electronically coupled to the processing circuit 135. In response to the trigger 115 being activated (e.g., depressed, pushed, etc. by the user), the processing circuit 135 may enable deployment of one or more cartridges 120 from the CEW 100, as discussed further herein.

In various embodiments, the power supply 140 may be configured to provide power to various components of the CEW 100. For example, the power supply 140 may provide energy for operating the electronic and/or electrical components (e.g., parts, subsystems, circuits, etc.) of the CEW 100 and/or one or more cartridges 120. The power supply 140 may provide electrical power. Providing electrical power may include providing a current at a voltage. The power supply 140 may be electrically coupled to the processing circuit 135 and/or the signal generator 145. In various embodiments, in response to a control interface comprising electronic properties and/or components, the power supply 140 may be electrically coupled to the control interface. In various embodiments, in response to the trigger 115 comprising electronic properties or components, the power supply 140 may be electrically coupled to the trigger 115. The power supply 140 may provide an electrical current at a voltage. Electrical power from the power supply 140 may be provided as a direct current ("DC"). Electrical power from the power supply 140 may be provided as an alternating current ("AC"). The power supply 140 may comprise a battery. The energy of the power supply 140 may be renewable or exhaustible, and/or replaceable. For example, the power supply 140 may comprise one or more rechargeable or disposable batteries. In various embodiments, the energy from the power supply 140 may be converted from one form (e.g., electrical, magnetic, thermal) to another form to perform the functions of a system.

The power supply 140 may provide energy for performing the functions of the CEW 100. For example, the power supply 140 may provide the electrical current to the signal generator 145 that is provided through a target to impede locomotion of the target (e.g., via cartridge 120). The power supply 140 may provide the energy for a stimulus signal. The power supply 140 may provide the energy for other signals, including an ignition signal, as discussed further herein.

In various embodiments, the processing circuit 135 may comprise any circuitry, electrical components, electronic components, software, and/or the like configured to perform various operations and functions discussed herein. For example, the processing circuit 135 may comprise a processing circuit, a processor, a digital signal processor, a microcontroller, a microprocessor, an application specific integrated circuit (ASIC), a programmable logic device, logic circuitry, state machines, MEMS devices, signal conditioning circuitry, communication circuitry, a computer, a computer-based system, a radio, a network appliance, a data bus, an address bus, and/or any combination thereof. In various embodiments, the processing circuit 135 may include passive electronic devices (e.g., resistors, capacitors, inductors, etc.) and/or active electronic devices (e.g., op amps, comparators, analog-to-digital converters, digital-to-analog converters, programmable logic, SRCs, transistors, etc.). In various embodiments, processing circuit 135 may include data buses, output ports, input ports, timers, memory, arithmetic units, and/or the like.

In various embodiments, the processing circuit 135 may include signal conditioning circuity. Signal conditioning circuitry may include level shifters to change (e.g., increase, decrease) the magnitude of a voltage (e.g., of a signal) before receipt by the processing circuit 135 or to shift the magnitude of a voltage provided by the processing circuit 135.

In various embodiments, the processing circuit 135 may be configured to control and/or coordinate operation of some or all aspects of the CEW 100. For example, the processing circuit 135 may include (or be in communication with) a memory (not shown) configured to store data, programs, and/or instructions. The memory may comprise a tangible non-transitory computer-readable memory. Instructions stored on the tangible non-transitory memory may allow the processing circuit 135 to perform various operations, functions, and/or steps, as described herein.

In various embodiments, the memory may comprise any hardware, software, and/or database component capable of storing and maintaining data. For example, the memory may comprise a database, data structure, memory component, or the like. The memory may comprise any suitable non-transitory memory known in the art, such as, an internal memory (e.g., random access memory (RAM), read-only memory (ROM), solid state drive (SSD), etc.), removable memory (e.g., an SD card, an xD card, a CompactFlash card, etc.), or the like.

The processing circuit 135 may be configured to provide and/or receive electrical signals whether digital and/or analog in form. The processing circuit 135 may provide and/or receive digital information via a data bus using any protocol. The processing circuit 135 may receive information, manipulate the received information, and provide the manipulated information. The processing circuit 135 may store information and retrieve stored information. Information received, stored, and/or manipulated by the processing circuit 135 may be used to perform a function, control a function, and/or to perform an operation or execute a stored program.

The processing circuit 135 may control the operation and/or function of other circuits and/or components of the CEW 100. The processing circuit 135 may receive status information regarding the operation of other components, perform calculations with respect to the status information, and provide commands (e.g., instructions) to one or more other components. The processing circuit 135 may command another component to start operation, continue operation, alter operation, suspend operation, cease operation, or the like. Commands and/or status may be communicated between the processing circuit 135 and other circuits and/or components via any type of bus (e.g., SPI bus) including any type of data/address bus.

In various embodiments, the processing circuit 135 may be mechanically and/or electronically coupled to the trigger 115. The processing circuit 135 may be configured to detect an activation, actuation, depression, input, etc. (collectively, an "activation event") of the trigger 115. In response to detecting the activation event, the processing circuit 135 may be configured to perform various operations and/or functions, as discussed further herein. The processing circuit 135 may also include a sensor (e.g., a trigger sensor) (not shown) attached to the trigger 115 and configured to detect an activation event of the trigger 115. The sensor may comprise any suitable sensor, such as a mechanical and/or electronic sensor capable of detecting an activation event in the trigger 115 and reporting the activation event to the processing circuit 135.

In various embodiments, the processing circuit 135 may be mechanically and/or electronically coupled to a control interface (not shown). The processing circuit 135 may be configured to detect an activation, actuation, depression, input, etc. (collectively, a "control event") of the control interface. In response to detecting the control event, the processing circuit 135 may be configured to perform various operations and/or functions, as discussed further herein. The processing circuit 135 may also include a sensor (e.g., a control sensor) (not shown) attached to a control interface and configured to detect a control event of the control interface. The sensor may comprise any suitable mechanical and/or electronic sensor capable of detecting a control event in the control interface and reporting the control event to the processing circuit 135.

In various embodiments, the processing circuit 135 may be electrically and/or electronically coupled to the power supply 140. The processing circuit 35 may receive power from the power supply 140. The power received from the power supply 140 may be used by the processing circuit 135 to receive signals, process signals, and transmit signals to various other components in the CEW 100. The processing circuit 135 may use power from the power supply 140 to detect an activation event of the trigger 115, a control event of a control interface, or the like, and generate one or more control signals in response to the detected events. The control signal may be based on the control event and the activation event. The control signal may be an electrical signal.

In various embodiments, the processing circuit 135 may be electrically and/or electronically coupled to the signal generator 145. The processing circuit 135 may be configured to transmit or provide control signals to the signal generator 145 in response to detecting an activation event of the trigger 115. Multiple control signals may be provided from the processing circuit 135 to the signal generator 145 in series. In response to receiving the control signal, the signal generator 145 may be configured to perform various functions and/or operations, as discussed further herein.

In various embodiments, the signal generator 145 may be configured to receive one or more control signals from the processing circuit 135. The signal generator 145 may provide an ignition signal to the cartridge 120 based on the control signals. The signal generator 145 may be electrically and/or electronically coupled to the processing circuit 135 and/or the cartridge 120. The signal generator 145 may be electrically coupled to the power supply 140. The signal generator 145 may use power received from the power supply 140 to generate an ignition signal. For example, the signal generator 145 may receive an electrical signal from the power supply 140 that has first current and voltage values. The signal generator 145 may transform the electrical signal into an ignition signal having second current and voltage values. The transformed second current and/or the transformed second voltage values may be different from the first current and/or voltage values. The transformed second current and/or the transformed second voltage values may be the same as the first current and/or voltage values. The signal generator 145 may temporarily store power from the power supply 140 and rely on the stored power entirely or in part to provide the ignition signal. The signal generator 145 may also rely on received power from the power supply 140 entirely or in part to provide the ignition signal, without needing to temporarily store power.

The signal generator 145 may be controlled entirely or in part by processing circuit 135. In various embodiments, the signal generator 145 and the processing circuit 135 may be separate components (e.g., physically distinct and/or logically discrete). The signal generator 145 and the processing circuit 135 may be a single component. For example, a control circuit within the housing 110 may at least include the signal generator 145 and the processing circuit 135. The control circuit may also include other components and/or arrangements, including those that further integrate corresponding function of these elements into a single component or circuit, as well as those that further separate certain functions into separate components or circuits.

The signal generator 145 may be controlled by the control signals to generate an ignition signal having a predetermined current value or values. For example, the signal generator 145 may include a current source. The control signal may be received by the signal generator 145 to activate the current source at a current value of the current source. An additional control signal may be received to decrease a current of the current source. For example, signal generator 145 may include a pulse width modification circuit coupled between a current source and an output of the control circuit. A second control signal may be received by signal generator 145 to activate the pulse width modification circuit, thereby decreasing a non-zero period of a signal generated by the current source and an overall current of an ignition signal subsequently output by the control circuit. The pulse width modification circuit may be separate from a circuit of the current source or, alternatively, integrated within a circuit of the current source. Various other forms of signal generators 145 may alternatively or additionally be employed, including those that apply a voltage over one or more different resistances to generate signals with different currents. In various embodiments, the signal generator 145 may comprise a high-voltage module configured to deliver an electrical current having a high voltage (e.g., greater than 10,000 volts). In various embodiments, the signal generator 145 may comprise a low-voltage module configured to deliver an electrical current having a lower voltage. For example, a low-voltage module may be configured to provide an electrical current at a lower voltage that is equal to or less than 2,000 volts.

Responsive to receipt of a signal indicating activation of the trigger 115 (e.g., an activation event), the control circuit may provide an ignition signal to the cartridge 120. For example, the signal generator 45 may provide an electrical signal as an ignition signal to the cartridge 120 in response to receiving a control signal from the processing circuit 135. In various embodiments, the ignition signal may be separate and distinct from a stimulus signal. For example, a stimulus signal in the CEW 100 may be provided to a different circuit within the cartridge 120, relative to a circuit to which an ignition signal is provided. The signal generator 145 may be configured to generate a stimulus signal. The signal generator 145 may also provide a ground signal path for the cartridge 120, thereby completing a circuit for an electrical signal provided to the cartridge 120 by the signal generator 145. The ground signal path may also be provided to the cartridge 120 by other elements in the housing 110, including the power supply 140.

A cartridge 120 may comprise one or more propulsion modules 125 and one or more electrodes E. For example, the cartridge 120 may comprise a single propulsion module 125 configured to deploy a single electrode E. As a further example, the cartridge 120 may comprise a single propulsion module 125 configured to deploy a plurality of electrodes E. As a further example, the cartridge 120 may comprise a plurality of propulsion modules 125 and a plurality of electrodes E, with each propulsion module 125 configured to deploy one or more electrodes E. In various embodiments, and as depicted in FIG. 2, the cartridge 120 may comprise a first propulsion module 125-1 configured to deploy a first electrode E1, a second propulsion module 125-2 configured to deploy a second electrode E2, a third propulsion module 125-3 configured to deploy a third electrode E3, and a fourth propulsion module 125-4 configured to deploy a fourth electrode E4. Each series of propulsion modules and electrodes may be contained in the same and/or separate cartridges.

In various embodiments, the propulsion module 125 may be coupled to, or in communication with one or more electrodes E in the cartridge 120. In various embodiments, cartridge 120 may comprise a plurality of propulsion modules 125, with each propulsion module 125 coupled to, or in communication with, one or more electrodes E. The propulsion module 125 may comprise any device, propellant (e.g., air, gas, etc.), primer, or the like capable of providing a propulsion force in the cartridge 120. The propulsion force may include an increase in pressure caused by rapidly expanding gas within an area or chamber. The propulsion force may be applied to one or more electrodes E in the cartridge 120 to cause the deployment of the one or more electrodes E. The propulsion module 125 may provide the propulsion force in response to the cartridge 120 receiving an ignition signal, as previously discussed.

In various embodiments, the propulsion force may be directly applied to one or more electrodes E. For example, the propulsion force from the propulsion module 125-1 may be provided directly to the first electrode E1. The propulsion module 125 may be in fluid communication with one or more electrodes E to provide the propulsion force. For example, the propulsion force from propulsion module 125-1 may travel within a housing or channel of the cartridge 120 to the first electrode E1. The propulsion force may travel via a manifold in the cartridge 120.

In various embodiments, the propulsion force may be provided indirectly to one or more electrodes E. For example, the propulsion force may be provided to a secondary source of propellant within the propulsion module 125. The propulsion force may launch the secondary source of propellant within the propulsion module 125, causing the secondary source of propellant to release propellant. A force associated with the released propellant may in turn provide a force to one or more electrodes E. A force generated by the secondary source of propellant may cause the one or more electrodes E to be deployed from the cartridge 120 and the CEW 100.

In various embodiments, each electrode E1, E2, E3, E4 may comprise any suitable type of projectile. For example, one or more electrodes E may be or include a projectile, an electrode (e.g., an electrode dart), or the like. An electrode may include a spear portion, designed to pierce or attach proximate a tissue of a target in order to provide a conductive electrical path between the electrode and the tissue, as previously discussed herein.

A control interface (not shown) of the CEW 100 may comprise, or be similar to, any control interface disclosed herein. In various embodiments, the control interface may be configured to control selection of firing modes in the CEW 100. Controlling selection of firing modes in the CEW 100 may include disabling firing of the CEW 100 (e.g., a safety mode, etc.), enabling firing of the CEW 100 (e.g., an active mode, a firing mode, an escalation mode, etc.), controlling deployment of the cartridges 120, and/or similar operations, as discussed further herein.

The control interface may be located in any suitable location on or in the housing 110. For example, the control interface may be coupled to an outer surface of the housing 110. The control interface may be coupled to an outer surface of housing 110 proximate the trigger 115 and/or a guard of the housing 110. The control interface may be electrically, mechanically, and/or electronically coupled to the processing circuit 135. In various embodiments, in response to a control interface comprising electronic properties or components, the control interface may be electrically coupled to the power supply 140. The control interface may receive power (e.g., electrical current) from the power supply 140 to power the electronic properties or components.

The control interface may be electronically or mechanically coupled to the trigger 115. For example, and as discussed further herein, the control interface may function as a safety mechanism. In response to the control interface being set to a "safety mode," the CEW 100 may be unable to launch electrodes from the cartridge 120. For example, the control interface may provide a signal (e.g., a control signal) to the processing circuit 135 instructing the processing circuit 135 to disable deployment of electrodes from the cartridge 120. As a further example, the control interface may electronically or mechanically prohibit the trigger 115 from activating (e.g., prevent or disable a user from depressing the trigger 115; prevent the trigger 115 from launching an electrode; etc.).

The control interface may comprise any suitable electronic or mechanical component capable of enabling selection of firing modes. For example, the control interface may comprise a fire mode selector switch, a safety switch, a safety catch, a rotating switch, a selection switch, a selective firing mechanism, and/or any other suitable mechanical control. As a further example, the control interface may comprise a slide, such as a handgun slide, a reciprocating slide, or the like. As a further example, the control interface may comprise a touch screen or similar electronic component.

The safety mode may be configured to prohibit deployment of an electrode from the cartridge 120 in the CEW 100. For example, in response to a user selecting the safety mode, the control interface may transmit a safety mode instruction to the processing circuit 135. In response to receiving the safety mode instruction, the processing circuit 135 may prohibit deployment of an electrode from the cartridge 120. The processing circuit 135 may prohibit deployment until a further instruction is received from the control interface (e.g., a firing mode instruction). As previously discussed, a control interface may also, or alternatively, interact with the trigger 115 to prevent activation of the trigger 115. In various embodiments, the safety mode may also be configured to prohibit deployment of a stimulus signal from the signal generator 145, such as, for example, a local delivery.

The firing mode may be configured to enable deployment of one or more electrodes from the cartridge 120 in the CEW 100. For example, and in accordance with various embodiments, in response to a user selecting the firing mode, a control interface may transmit a firing mode instruction to the processing circuit 135. In response to receiving the firing mode instruction, the processing circuit 135 may enable deployment of an electrode from the cartridge 120. In that regard, in response to the trigger 115 being activated, the processing circuit 135 may cause the deployment of one or more electrodes. The processing circuit 135 may enable deployment until a further instruction is received from a control interface (e.g., a safety mode instruction). As a further example, and in accordance with various embodiments, in response to a user selecting the firing mode, the control interface may also mechanically (or electronically) interact with the trigger 115 of the CEW 100 to enable activation of the trigger 115.

In various embodiments, the CEW may deliver a stimulus signal via a circuit that includes a signal generator positioned in the handle of the CEW. An interface (e.g., cartridge interface) on each cartridge inserted into the handle electrically couples to an interface (e.g., handle interface) in the handle. The signal generator couples to each cartridge, and thus to the electrodes, via the handle interface and the cartridge interface. A first filament couples to the interface of the cartridge and to a first electrode. A second filament couples to the interface of the cartridge and to a second electrode. The stimulus signal travels from the signal generator, through the first filament and the first electrode, through target tissue, and through the second electrode and second filament back to the signal generator.

In various embodiments, while providing the stimulus signal (e.g., one pulse of the stimulus signal), the signal generator provides the stimulus signal at a first voltage to the first electrode, via the first filament, and at a second voltage to the second electrode via the second filament. The voltage difference across the first electrode and the second electrode applies a voltage potential across the target. The voltage potential across target tissue delivers charge into and through target tissue. The charge through target tissue impedes locomotion of the target.

Figure 3:
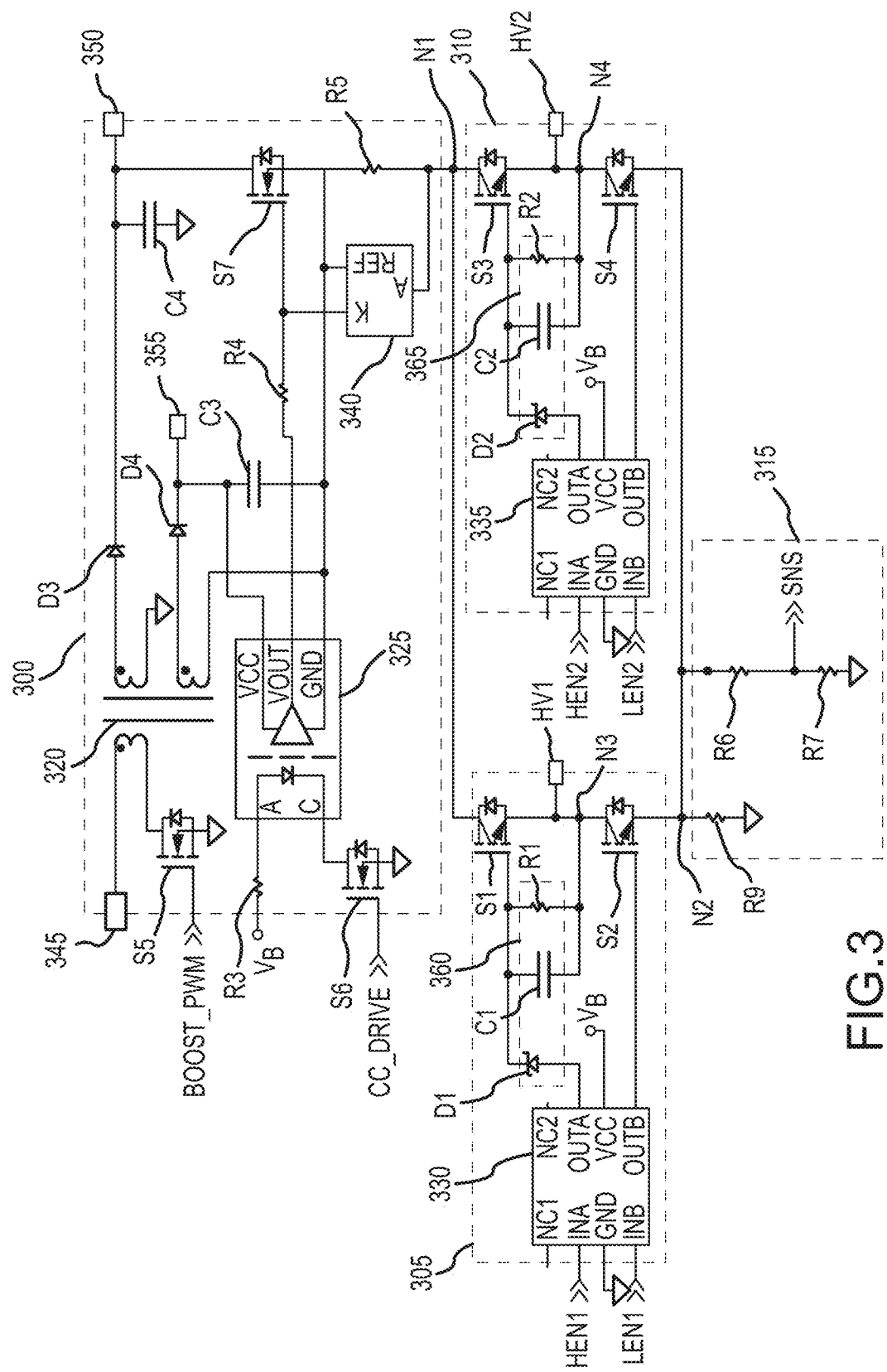
FIG. 3 is an implementation of a signal generator circuit, in accordance with a first embodiment.
Figure 4:
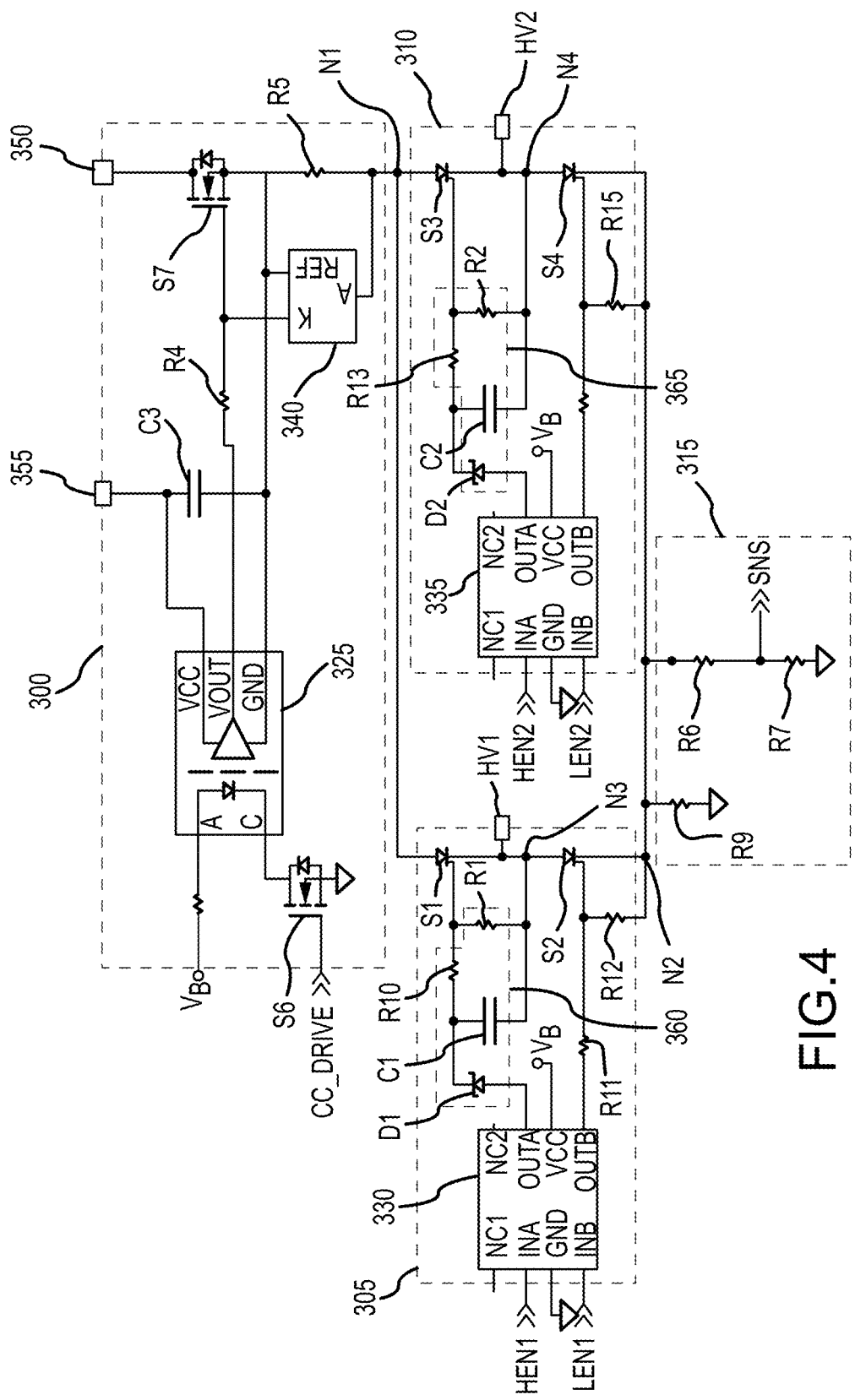
FIG. 4 is an implementation of a signal generator circuit, in accordance with a second embodiment.

According to various embodiments, and referring to FIGS. 3 and 4, the signal generator 145 may generate one or more stimulus signals. The stimulus signal may be applied to the electrodes, where two electrodes electrically couple to form a current path through the target. The present embodiments of the signal generator 145 may provide a stimulus signal having 500 volts to 2000 volts. In various embodiments, the signal generator 145 may comprise a current source circuit 300, a plurality of driver circuits, and a current sense circuit 315. The plurality of driver circuits may be connected to the current source circuit 300 at a first node N1 and connected to the current sense circuit at a second node N2. The second node N2 may electrically connect the plurality of driver circuits directly to a ground or to the ground via a passive element, such a resistor.

The current source circuit 300 may be configured to provide a constant current to the plurality of driver circuits. In various embodiments, the current source circuit 300 may comprise a high-side driver module 325 responsive to a control signal CC_DRIVE, a regulator 340, and a seventh switch device S7. The current source circuit 300 may be connected to receive a stimulus supply voltage $V_S$, such as a 1000V power supply, a power supply voltage, and a bias voltage $V_B$, such as an 18V bias supply. For example, the current source circuit 300 may further comprise a first terminal 350 to receive the stimulus supply voltage Vs and a second terminal 355 to receive the bias voltage $V_B$.

In some embodiments, the current source circuit 300 may further comprise a transformer 320 connected to the power supply voltage and the high-side driver module 325 (for example, as illustrated in FIG. 3). The transformer 320 may comprise a primary winding and one or more secondary windings. The primary winding of the transformer 320 may be connected to a power supply (e.g., a battery) at a battery terminal 345 and thus operate according to current provided by the power supply. The transformer 320 may also be responsive to a control signal BOOST_PWM that is capable of modulating or otherwise varying the current through the primary winding. For example, a fifth switch device S5, configured to be controlled by the control signal BOOST_PWM, may be connected to the primary winding. In embodiments, the current source circuit 300 may be configured to generate one or more voltages. For example, the current source circuit 300 may comprise a transformer (e.g., transformer 320) configured to generate the stimulus supply voltage $V_S$ and the bias voltage $V_B$ according to power received from a power supply at the battery terminal 345.

The high-side driver module 325 may be used in conjunction with the regulator 340 and the seventh switch device S7 to generate the constant current. The high-side driver module 325 may be responsive to and operate according to the control signal CC_DRIVE and the bias voltage $V_B$. In various embodiments, the high-side driver module 325 may comprise any circuit or system suitable for driving a gate of an electronic switching device, providing voltage isolation and/or impedance matching. For example, the high-side driver module 325 may comprise an optocoupler circuit to receive the control signal CC_DRIVE and transfer electrical signals between two isolated circuits by using light, a gate-drive transformer, or the like.

The regulator 340 may be used in conjunction with the high-side driver module 325 and the seventh switch device S7 to generate the constant current. In various embodiments, the regulator 340 may comprise any circuit or system suitable for regulating a voltage and/or current and monitoring voltage, and the regulator 340 may provide an adjustable output voltage. In an exemplary embodiment, the regulator 340 may comprise a first terminal A, a second terminal K, and a third terminal REF. The first terminal A may be connected to the first node N1, the second terminal K may be connected to an output terminal of the high-side driver module 325, and the third terminal may be connected to a ground common with the high-side driver module 325.

The seventh switch device S7 may be used in conjunction with the high-side driver module 325 and the regulator 340 to generate the constant current. The seventh switch device S7 may comprise any device or circuit suitable for controlling current flow, such as a transistor (e.g., a metal-oxide-semiconductor filed-effect transistor (MOSFET) or an insulated gate bipolar transistor (IGBT)) or a silicon controlled rectifier, and having a first terminal, a second terminal, and a third terminal. In an exemplary embodiment, the first terminal of the seventh switch device S7 may be connected to receive the stimulus supply voltage $V_S$ via the first terminal 350 of the current source circuit 300.

The current source circuit 300 may further comprise any number of passive elements, such as resistive elements (e.g., a third resistor R3 and a fourth resistor R4), charge storage devices (e.g., a third capacitor C3 and a fourth capacitor C4), and diodes (e.g., a third diode D3 and a fourth diode D4). The current source circuit 300 may further comprise any number of switch devices (e.g., the fifth switch device S5 and a sixth switch device S6). The switch devices may be a current controlled device or a voltage controlled device and may comprise any device or circuit suitable for controlling current flow, such as a transistor (for example, an IGBT as illustrated in FIG. 3), a silicon controlled rectifier (for example, as illustrated in FIG. 4), a MOSFET, or the like.

In various embodiments, the sixth switch device S6 may be connected to a terminal of the high-side driver module 325 and may be configured to receive and operate according to the control signal CC_DRIVE. For example, the control signal CC_DRIVE may be used turn the sixth switch device S6 ON and OFF. The high-side driver module 325 may be responsive to and operate according to the state of the sixth switch device S6. For example, the high-side driver module 325 may be activated (enabled) when the sixth switch device S6 is ON (enabled).

In one embodiment, and referring to FIG. 4, the current source circuit 300 may further comprise a stabilizer element (not shown) connected in parallel with the third resistor R3. The stabilizer element may be used to more precisely control the waveform of the current output by the current source circuit 300. For example, the stabilizer element may comprise a capacitor.

In an exemplary embodiment, the signal generator 145 may comprise a first driver circuit 305 and a second driver circuit 310 connected to the current source circuit 300 at the first node N1. Accordingly, all of the driver circuits may be operated by the current source circuit 300. In other embodiments, the signal generator 145 may comprise any number of driver circuits, such as ten (10) driver circuits. According to various embodiments, each driver circuit may generate and provide the stimulus signal to a single electrode.

The first driver circuit 305 may be configured to generate a first stimulus signal and transmit the first stimulus signal to an electrode (e.g., the first electrode E1) via a first driver terminal HV1. The first driver circuit 305 may comprise a first driver module 330, a first charge storage circuit, a first switch device S1, and a second switch device S2.

The first driver module 330 may be configured to receive enable signals from the processing circuit 135 and control the operation of the first driver circuit 305 via the enable signals. For example, the first driver module 330 may receive a first high enable signal HEN1 and a first low enable signal LEN1 from the processing circuit 135 at inputs INA and INB, respectively, and transmit the enable signals to outputs OUTA and OUTB. The first high enable signal HEN1 and the first low enable signal LEN1 may control the first and second switch devices S1, S2.

In embodiments, the first driver module 330 may be further configured to receive a bias voltage $V_B$. Transmitting the enable signals to outputs OUTA and OUTB may comprise providing (e.g., modifying, adjusting, determining, etc.) a voltage of the enable signals relative to the bias voltage $V_B$. A voltage of one or more of the enable signals at outputs OUTA and/or OUTB may be greater than a voltage of the one or more respective enable signals received at inputs INA and/or INB. For example, the first high enable signal HEN1 input via input INA and the first low enable signal LEN1 input via input INB may each have a reference voltage (e.g., 5 volts). According to the received enable signals and the bias voltage $V_B$, the first driver module 330 may be configured to provide (e.g., generate, modify, transform, etc.) enable signals with a voltage equal to the bias voltage bias voltage $V_B$. For example, the first high enable signal HEN1 output via output OUTA may have a voltage equal to the bias voltage VB and the first low enable signal LEN1 output via output OUTB may have a voltage equal to the bias voltage $V_B$. In embodiments, providing the enable signals via outputs OUTA and OUTB may be performed using voltages separately available within CEW 100 and/or without a separate transformer included in the first driver module 330.

The first switch device S1 may operate according to the current source circuit 300 and operate in conjunction with the second switch device S2 and the first driver module 330 to control the stimulus signal at the first driver terminal HV1. In various embodiments, the first switch device S1 may comprise any circuit and/or device suitable for controlling a current and/or voltage at the first driver terminal HV1. In various embodiments, the first switch device S1 may comprise three terminals, such as a positive terminal, a negative terminal, and a gate terminal. For example, the first switch device S1 may comprise a transistor, such as a metal-oxide-semiconductor filed-effect transistor, an insulated gate bipolar transistor, a silicon controlled rectifier, or the like. In an exemplary embodiment, the first switch device S1 may be connected to the first node N1 via its positive terminal. The negative terminal of the first switch device S1 may be connected to the first charge storage device C1. The gate terminal of the first switch device S1 may be connected to the first driver module 330 and receive the first high enable signal HEN1 via output OUTA.

The second switch device S2 may operate according to the first driver module 330 and in conjunction with the first switch device S1 to control the stimulus signal at the first driver terminal HV1. In various embodiments, the second switch device S2 may comprise any circuit and/or device suitable for controlling a current and/or voltage at the first driver terminal HV1. In various embodiments, the second switch device S2 may comprise three terminals, such as a positive terminal, a negative terminal, and a gate terminal. For example, the second switch device S2 may comprise a transistor, such as a metal-oxide-semiconductor filed-effect transistor, a silicon controlled rectifier, or the like. In an exemplary embodiment, the second switch device S2 may be connected to the second node N2 via its negative terminal. The positive terminal of the second switch device S2 may be connected to the negative terminal of the first switch device S1 at a third node N3. In other words, the first and second switch devices S1, S2 may be connected in series with each other at the third node N3. The gate terminal of the second switch device S2 may be connected to the first driver module 330 and receive the first low enable signal LEN1 via output OUTB. Accordingly, the first switch device S1 and the second switch device S2 may be operated independent from each other.

In various embodiments, controlling the first switch device S1 to be disposed in a closed state (e.g., turned ON) may require a minimum voltage difference (e.g., voltage drop) to be maintained between a control terminal (e.g., gate terminal) and an output terminal (e.g., negative terminal) of the first switch device S1. For example, and in accordance with a stimulus signal and resistance of a target, a higher voltage of at least 10 volts, between 10 volts and 20 volts, or at least 20 volts may be required at the control terminal relative to the output terminal in order to drive the first switch device S1 in the closed state. When this voltage difference is not provided, the first switch device S1 may be driven in an open state (e.g., turned OFF). In embodiments, the higher voltage may be provided by a transformer and other passive elements separately coupled to the first switch device S1. For example, a control signal may be provided to the control terminal of the first switch device S1 by a set of electrical circuit devices similar to the transformer 320, the third capacitor C3, and the fourth diode D4 coupled to a control terminal of the seventh switch device S7. However, an additional transformer and other such electrical circuit devices may require additional space in housing 110 of the CEW 100, increasing a minimum required size of the housing 110. The additional space required may be particularly sizeable when these additional electrical circuit devices are separately provided for each driver circuit of a plurality of driver circuits in the CEW 100. The additional electrical circuit devices may also increase an overall complexity of electrically integrating and insulating each driver circuit of the plurality of driver circuits of the CEW 100.

Embodiments according to various aspects of the present disclosure address these issues and others by using a charge storage circuit for each driver circuit. For example, the first driver circuit 305 may comprise a first charge storage circuit 360 and the second driver circuit 310 may comprise a second charge storage circuit 365. Each charge storage circuit 360,365 may comprise a plurality of passive electrical circuit devices. Each charge storage circuit 360,365 may comprise a reduced set of electrical circuit devices. For example, and in contrast with the electrical circuit devices coupled to the seventh switch device S7 in FIG. 3, each of the first charge storage circuit 360 and the second charge storage circuit 365 may exclude a transformer. Each charge storage circuit 360,365 may be electrically coupled between a power source and a respective switch device. For example, the first charge storage circuit 360 may be coupled between the first driver module 330 and the first switch device S1, while the second charge storage circuit 365 may be coupled between a second driver module 335 and a third switch device S3. Each charge storage circuit 360,365 may be connected in parallel with at least a portion of the respective switch device. For example, the first charge storage circuit 360 may be coupled between a control terminal of the first switch device S1 and an output terminal of the first switch device S1. The second charge storage circuit 365 may be coupled between a control terminal of the third switch device S3 and an output terminal of the third switch device S3.

The first charge storage circuit 365 may be configured to control the first switch device S1. Control of the first switch device S1 may comprise providing a charge to a control terminal of the first switch device S1. The charge may be provided to the control terminal to drive the first switch device S1 in a closed state. The first charge storage circuit 360 may be electrically connected in parallel with the control terminal of the first switch device S1 and an output terminal of the first switch device S1 such that the charge may provide a higher voltage at the control terminal relative to the output terminal. The higher voltage may be provided independent of changes (e.g., increases, decreases, etc.) in a voltage provided at the output terminal of the first switch device S1. In embodiments, the first charge storage circuit 360 may be a transformerless charge storage circuit, comprise one or more capacitors, and/or comprise one or more resistive elements. For example, the first charge storage circuit 360 may comprise a first charge storage device C1 and a first resistor R1. The first charge storage device C1 may be connected between the gate terminal of the first switch device S1 and the third node N3. For example, in a case where the first charge storage device C1 comprises a capacitor, a first terminal of the capacitor may be connected to the gate terminal of the first switch device S1 and a second terminal of the capacitor may be connected to the third node N3. In embodiments, the first charge storage device C1 of the first charge storage circuit 360 may be configured to store a charge provided to the first charge storage circuit 360 according to the enable signal output via OUTA of the first driver module 330.

The first charge storage circuit 360 may further comprise a resistive element, such as resistor R1, connected in parallel with the first charge storage device C1. The resistive element may be configured to discharge a charge stored in the first charge storage circuit 360. Values of the first charge storage device C1, resistive element, and/or other electrical circuit devices of the first charge storage circuit may be selected such that a minimum voltage is maintained across the control terminal and the output terminal of the first switch device S1 for a minimum period of time after a charge is stored in the first charge storage circuit 360 according to the first high enable signal HEN1.

In addition, the first charge storage circuit 360 may comprise a first diode D1 connected between the first driver module 330 and the gate terminal of the first switch device S1. The first diode D1 may be coupled to a first terminal of the first charge storage circuit 360. For example, the first diode D1 may be coupled to a first terminal of the first charge storage device C1.

In one embodiment, and referring to FIG. 4, the first charge storage circuit 360 may further comprise a tenth resistor R10 connected between the first storage device C1 and the first switch device S1. Accordingly, the first terminal of the first charge storage circuit 360 may be further coupled to the control terminal of the first switch device S1 directly or indirectly via a resistive element, such as the tenth resistor R10.

In addition, and referring to FIG. 4, the first driver circuit 305 may further comprise an eleventh resistor R11 connected between the second switch device S2 and the first driver module 330, and a twelfth resistor R12 connecting the eleventh resistor R11 to the second node N2.

The second driver circuit 310 may be configured to generate a second stimulus signal and transmit the second stimulus signal to an electrode (e.g., the second electrode E2) via a second driver terminal HV2. The second driver circuit 310 may comprise a second driver module 335, a second charge storage circuit 365, a third switch device S3, and a fourth switch device S4.

The second driver module 335 may be configured to receive enable signals from the processing circuit 135 and control the operation of the second driver circuit 310 via the enable signals. For example, the second driver module 335 may receive a second high enable signal HEN2 and a second low enable signal LEN2 from the processing circuit 135 at inputs INA and INB, respectively, and transmit the enable signals to outputs OUTA and OUTB. The second high enable signal HEN2 and the second low enable signal LEN2 may control the third and fourth switch devices S3, S4.

In embodiments, the second driver module 335 may be further configured to receive a bias voltage $V_B$. Transmitting the enable signals to outputs OUTA and OUTB may comprise providing (e.g., modifying, adjusting, determining, etc.) a voltage of the enable signals relative to the bias voltage $V_B$. A voltage of one or more of the enable signals at outputs OUTA and/or OUTB may be greater than a voltage of the one or more respective enable signals received at inputs INA and/or INB. For example, the first high enable signal HEN1 input via input INA and the first low enable signal LEN1 input via input INB may each have a reference voltage (e.g., 5 volts). The second driver module 335 may be configured to provide (e.g., generate, modify, transform, etc.) enable signals according to the received enable signals and the bias voltage VB in which the second high enable signal HEN2 output via output OUTA has a voltage equal to the bias voltage $V_B$ and the second low enable signal LEN2 output via output OUTB has a voltage equal to the bias voltage $V_B$. In embodiments, providing the enable signals via outputs OUTA and OUTB may be performed using voltages separately available within the CEW 100 and/or without using a separate transformer in the second driver module 335.

The third switch device S3 may operate according to the current source circuit 300 and operate in conjunction with the fourth switch device S4 and the second driver module 335 to control the stimulus signal at the second driver terminal HV2. In various embodiments, the third switch device S3 may comprise any circuit and/or device suitable for controlling a current and/or voltage at the first driver terminal HV1. In various embodiments, the third switch device S3 may comprise three terminals, such as a positive terminal, a negative terminal, and a gate terminal. For example, the third switch device S3 may comprise a transistor, such as a metal-oxide-semiconductor filed-effect transistor, a silicon controlled rectifier, or the like. In an exemplary embodiment, the third switch device S3 may be connected to the first node N1 via its positive terminal. The negative terminal of the third switch device S3 may be connected to the second charge storage device C2. The gate terminal of the third switch device S3 may be connected to the second driver module 335 and receive the second high enable signal HEN2 via the second driver module output OUTA.

The fourth switch device S4 may operate according to the second driver module 335 and in conjunction with the third switch device S3 to control the stimulus signal at the second driver terminal HV2. In various embodiments, the second switch device S may comprise any circuit and/or device suitable for controlling a current and/or voltage at the first driver terminal HV1. In various embodiments, the fourth switch device S4 may comprise three terminals, such as a positive terminal, a negative terminal, and a gate terminal. For example, the fourth switch device S4 may comprise a transistor, such as a metal-oxide-semiconductor filed-effect transistor, a silicon controlled rectifier, or the like. In an exemplary embodiment, the fourth switch device S4 may be connected to the second node N2 via its negative terminal. The positive terminal of the fourth switch device S4 may be connected to the negative terminal of the third switch device S3 at a fourth node N4. In other words, the third and fourth switch devices S3, S4 may be connected in series with each other at the fourth node N4. The gate terminal of the fourth switch device S4 may be connected to the second driver module 335 and receive the second low enable signal LEN2 via output OUTB. Accordingly, the third switch device S3 and the fourth switch device S4 may be operated independent from each other.

The second charge storage circuit 365 may be configured to control third switch device S3. Control of the third switch device S3 may comprise providing a charge to a control terminal of the third switch device S3. The charge may be provided to the control terminal to drive the third switch device S3 in a closed state. The second charge storage circuit 365 may be electrically connected in parallel with the control terminal of the third switch device S3 and an output terminal of the third switch device S3 such that the charge may provide a higher voltage at the control terminal relative to the output terminal. The higher voltage may be provided independent of changes (e.g., increases, decreases, etc.) in a voltage provide at the output terminal of the third switch device S3. In embodiments, the second charge storage circuit 365 may be a transformerless charge storage circuit, comprise one or more capacitors, and/or comprise one or more resistive elements. For example, the second charge storage circuit 365 may comprise a second charge storage device C2 and a second resistor R2.

The second charge storage device C2 may be connected between the gate terminal of the third switch device S3 and the fourth node N4. For example, in the case where the second charge storage device C2 comprises a capacitor, a first terminal of the capacitor may be connected to the gate terminal of the third switch device S3 and a second terminal of the capacitor may be connected to the fourth node N4. In embodiments, the second charge storage device C2 of the second charge storage circuit 365 may be configured to store a charge provided to the second charge storage circuit 365 according to the enable signal output via OUTA of the second driver module 335.

The second charge storage circuit 365 may further comprise a resistive element, such as resistor R2, connected in parallel with the second charge storage device C2. The resistive element may be configured to discharge a charge stored in the second charge storage circuit 365. Values of the second charge storage device C2, resistive element, and/or other electrical circuit devices of the second charge storage circuit 365 may be selected such that a minimum voltage is maintained across the control terminal and output terminal of the third switch device S3 for a minimum period of time after a charge according to the second high enable signal HEN2 output via output OUTA of the second driver module 335 is stored by the second charge storage circuit 365. In embodiments, values of the electrical circuit devices of the second charge storage circuit 365 (e.g., second charge storage device C2) may be equal to values of corresponding electrical circuit devices of the first charge storage circuit 360.

In addition, the second charge storage circuit 365 may comprise a second diode D2 connected between the second driver module 335 and the gate terminal of the third switch device S3. The second diode D2 may be coupled to a first terminal of the second charge storage circuit 365. For example, the second diode D2 may be coupled to a first terminal of the second charge storage device C2.

In one embodiment, and referring to FIG. 4, the second charge storage circuit 365 may further comprise a thirteenth resistor R13 connected between the second storage device C2 and the third switch device S3. The first terminal of the second charge storage circuit 365 may be further coupled to a control terminal of the second switch device S1 directly or indirectly via a resistive element such as the thirteenth resistor R13.

In addition, and referring to FIG. 4, the second driver circuit 310 may further comprise a fourteenth resistor R14 connected between the fourth switch device S4 and the second driver module 335, and a fifteenth resistor R15 connecting the fourteenth resistor R14 to the second node N2.

The current sense circuit 315 may be configured to measure a current through a load, such as the human target, and generate a sense signal SNS representing the current through the load. The current sense circuit 315 may transmit the sense signal SNS to the processing circuit 135, wherein the processing circuit 135 may use the information provided by the sense signal SNS to adjust the charge output to the load. In various embodiments, the current sense circuit 315 may comprise various passive elements, such as a sixth resistor R6, a seventh resistor R7 an eighth resistor R8, a ninth capacitor R9, and a fifth capacitor C5. The sixth and seventh resistors R6, R7 may be connected in series with each other and connected to a ground, while the eighth resistor R8 and the fifth capacitor C5 may be connected in parallel with the sixth and seventh resistors R6, R7 and connected to the ground. The sixth and ninth resistors R6, R9 may be directly connected to the second node N2. Accordingly, the sixth, seventh, and ninth resistors R6, R7, R9 connect the first and second driver circuits 305, 310 to the ground.

According to various embodiments, the resistance value of the resistors and the capacitance of the capacitors (i.e., charge storage devices) may vary and may be selected according to the particular application, desired output current and/or output voltage, desired operating specifications, the value of the supply voltage and the bias voltage, and the like.

In embodiments, switch devices of a driver circuit may comprise a same type of switch device. For example, in one embodiment, each of the first, second, third and fourth switch devices S1, S2, S3, S4 comprise a transistor, such as an IGBT or a MOSFET. In another embodiment, the first, second, third and fourth switch devices S1, S2, S3, S4 may comprise a silicon controlled rectifier. In other embodiments, switch devices of a driver circuit may comprise different types of switch devices. For example, and in yet another embodiment, the first and third switch devices S1, S3 may comprise a transistor, such as an IGBT or a MOSFET, and the second and fourth switch devices S2, S4 may comprise a silicon controlled rectifier.

According to various embodiments, and referring to FIGS. 1-7, the CEW 100 may perform electrical connectivity testing to determine which electrodes, if any, made contact with the target and are suitable for providing the stimulus signal. The CEW 100 may provide the stimulus signal to the target by operating the current source circuit 300 and at least two driver circuits that are determined to be in contact with the target.

Figure 6:
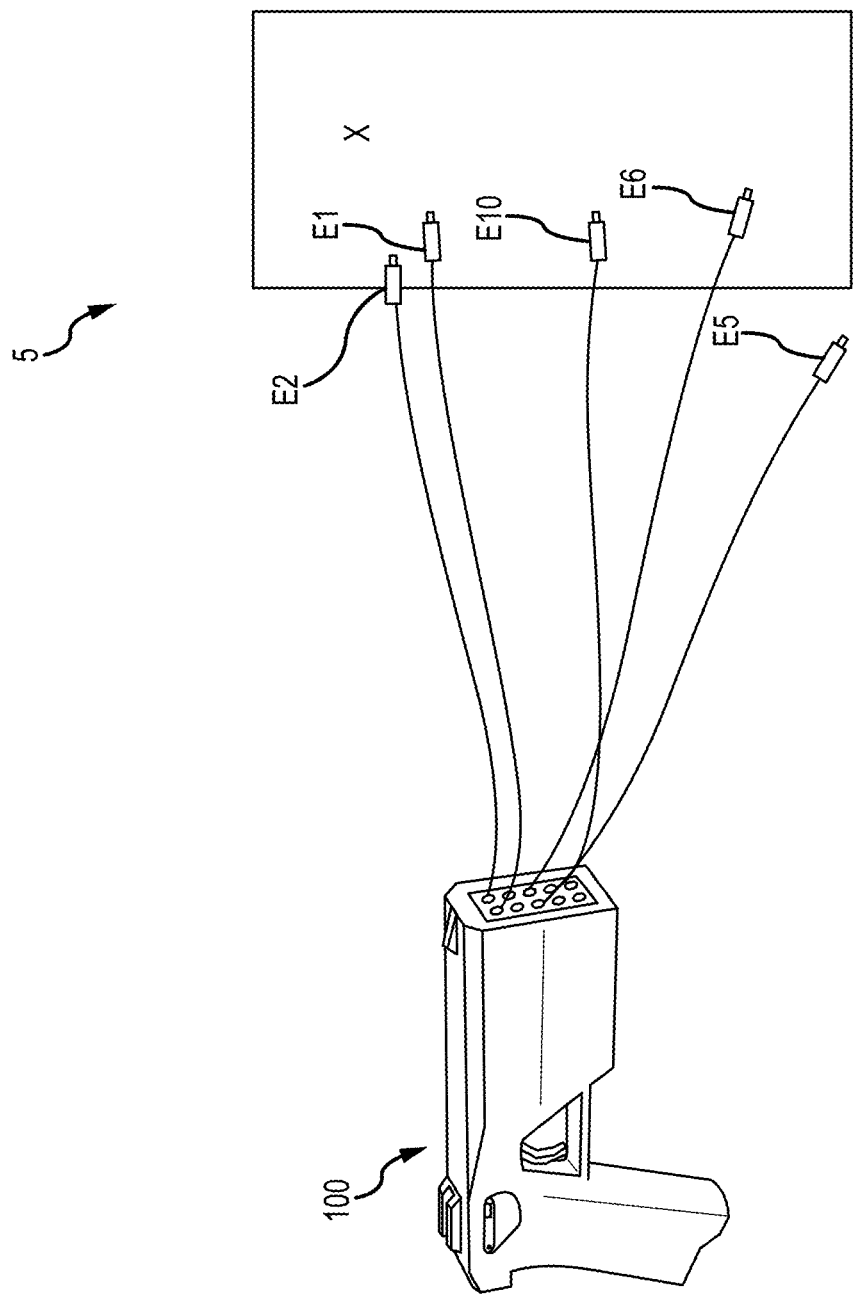
FIG. 6 is a view of electrodes deployed from the CEW, in accordance with various embodiments.
Figure 7:
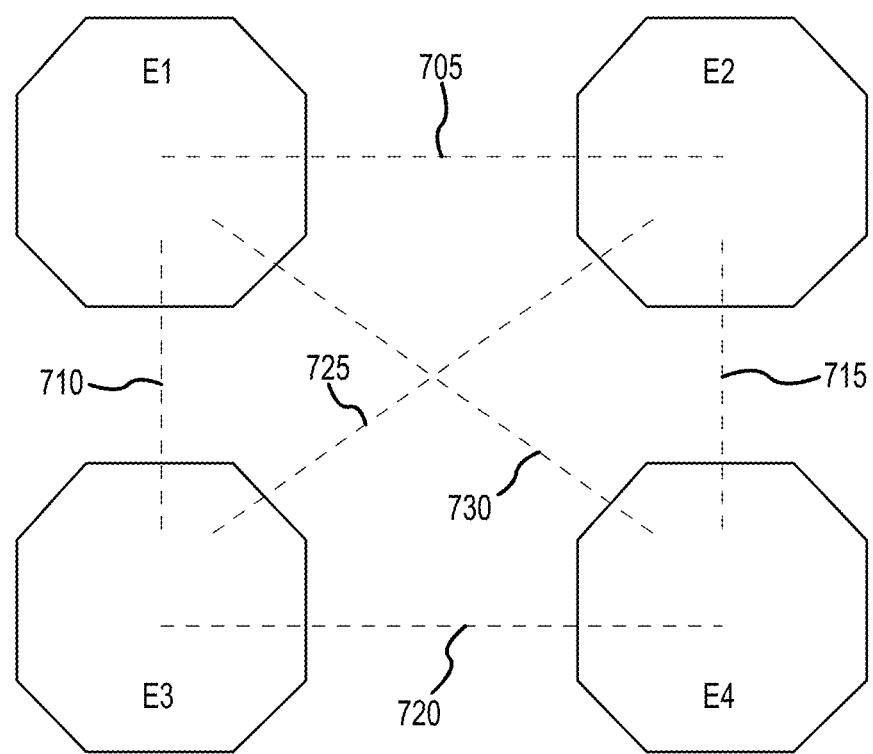
FIG. 7 is a diagram of a portion of the electrodes of FIG. 1 and possible electrical connections between the electrodes.

According to various embodiments and with reference to FIG. 6, the CEW 100 is depicted after deploying at least five electrodes (e.g., electrodes E1, E2, E5, E6 and E10). As depicted, electrodes E1, E2, E3, E10 are coupled to the target 5, and electrode E5 is not coupled to target 5 (e.g., a missed deployment). An electrode not coupled to a target is unable to provide a stimulus signal through the target. Testing electrical connectivity of launched electrodes may allow the CEW 100 to determine a state of connection of each electrode and determine whether each electrode is able to provide a stimulus signal through the target. Testing electrical connectivity of launched electrodes may also allow the CEW 100 to determine a relative distance between electrodes coupled to the target (e.g., dart spread, electrode spread, etc.). A greater distance between electrodes providing the stimulus signal may increase the likelihood of inducing NMI on the target.

The CEW 100 (e.g., via a signal generator) may be configured to apply test signals on launched electrodes to test the electrical connectivity of the electrode. For example, the CEW 100 may apply a first test signal (e.g., a first voltage) on a first electrode and a second test signal (e.g., a second voltage) on a second electrode. The first test signal may comprise a first voltage and the second test signal may comprise a second voltage different from the first voltage. The first voltage may be greater than the second voltage.

The CEW 100 may detect a measurement voltage of each of the remaining electrodes to determine the state of connection of each of the remaining electrodes (wherein each of the remaining electrodes is not provided a test signal). The measurement voltage may inform the state of connection, as discussed further herein. For example, because each of the remaining electrodes coupled to the same target share electrical coupling with the first electrode (provided the first test signal) and/or the second electrode (provided the second test signal), the measurement voltage of a remaining electrode coupled to the target should be greater than 0 volts (e.g., a same voltage as the first test signal, a same voltage as the second test signal, a voltage between the first test signal and the second test signal, etc.). Because each of the remaining electrodes not coupled to the same target do not share electrical coupling with the first electrode (provided the first test signal) and the second electrode (provided the second test signal), the measurement voltage of a remaining electrode not coupled to the same target should be 0 volts (or close to 0 volts).

The CEW 100 may determine a state of connection based on the measurement voltage. For example, in response to the measurement voltage being 0 volts, the state of connection of the third electrode is "not connected" (or a representation of not connected) (e.g., the third electrode is not coupled to the target). In response to the measurement voltage being a value equal to the first voltage, equal to the second voltage, or between the first voltage and the second voltage, the state of connection of the third electrode is "connected" (or a representation of connected) (e.g., the third electrode is coupled to the target). In response to the measurement voltage being a value numerically closer to the first voltage than the second voltage, the third electrode may be coupled to the target at a location on the target closer to the first electrode than the second electrode (e.g., the first electrode is coupled at a first location, the second electrode is coupled at a second location, the third electrode is coupled at a third location, and the third location is closer to the first location than the second location). In response to the measurement voltage being a value numerically closer to the second voltage than the first voltage, the third electrode may be coupled to the target at a location on the target closer to the second electrode than the first electrode (e.g., the first electrode is coupled at a first location, the second electrode is coupled at a second location, the third electrode is coupled at a third location, and the third location is closer to the second location than the first location). In response to the measurement voltage being a value that is the same (or about the same) as the first voltage, the state of connection of the second electrode is "not connected" (or a representation of not connected) (e.g., the first electrode and the third electrode are coupled to the target, but the second electrode is not coupled to the target). In response to the measurement voltage being a value that is the same (or about the same) as the second voltage, the state of connection of the first electrode is "not connected" (or a representation of not connected) (e.g., the second electrode and the third electrode are coupled to the target, but the first electrode is not coupled to the target).

In various embodiments, the CEW 100 may detect respective measurement voltages at multiple remaining electrodes at a same time. For example, the CEW 100 may deploy at least three electrodes towards a target. The CEW 100 may apply a first voltage of a test signal to a first electrode of the at least three electrodes and a second voltage of a second test signal to a second electrode of the at least three electrodes. The first voltage may be greater than the second voltage. The first voltage may be applied across the different first and second electrodes at a same time. In accordance with the test signals, the CEW 100 may concurrently detect a first measurement voltage at a third electrode from the at least three electrodes and a second measurement voltage at a fourth electrode from the at least four electrodes. Accordingly, a plurality of measurement voltages may be determined for a plurality of electrodes in accordance with a same one or more test signals (e.g., same test signal or pair of test signals, etc.).

The CEW 100 may determine an electrode spread between electrodes based on the state of connection and/or the measurement voltage. For example, and as previously discussed, in response to the measurement voltage being a value numerically closer to the first voltage than the second voltage, the third electrode may be coupled to the target at a location on the target closer to the first electrode than the second electrode (e.g., the first electrode is coupled at a first location, the second electrode is coupled at a second location, the third electrode is coupled at a third location, and the third location is closer to the first location than the second location). Because the third electrode is closer to the first electrode than the second electrode, a relative electrode spread between the three electrodes can be determined (e.g., a first electrode spread between the first electrode and the second electrode is greater than a second electrode spread between the first electrode and the third electrode). As can be extrapolated by one skilled in the art, additional tests, measurement voltages, and states of connection may further determine and refine locations of the electrodes on the target, and the relative electrode spread between electrodes on the target.

As discussed, the first voltage and the second voltage applied as test signals may comprise different values. For example, the first voltage may be greater than the second voltage, or the second voltage may be greater than the first voltage. The first voltage and the second voltage may each comprise low voltages. The first voltage and the second voltage may each be less than 50 volts. For example, the first voltage (or the second voltage) may be less than 5 volts and the second voltage (or the first voltage) may be greater than 10 volts. In some embodiments, the first voltage (or the second voltage) may be 3 volts and the second voltage (or the first voltage) may be 12 volts. In embodiments, a voltage difference between the first voltage and the second voltage may be one or more of less than ten volts, less than twenty volts, less than thirty volts, less than fifty volts, or less than one hundred volts. The voltage difference may comprise a difference of an absolute value of the first voltage and an absolute value of the second voltage.

In various embodiments, one or more measurement voltages and/or states of connection may be stored in memory of the CEW 100 by the processing circuit 135. Storing the one or more measurement voltages and/or the states of connection in memory may allow the CEW 100 to further use the collected data for reporting, testing, or other processes or uses.

In various embodiments, the CEW 100 may perform tests by applying test signals in any desired or structured order, and may perform as many tests as desired or necessary to test each launched electrode.

In various embodiments, the CEW 100 may perform tests between pulses of a stimulus signal, between deployment of additional electrodes, and/or at any other time as desired. For example, the CEW 100 may apply a first test signal and a second test signal to determine a first state of connection of launched electrodes (e.g., as previously discussed). After applying the first test signal and the second test signal, the CEW 100 may provide a first pulse of a stimulus signal through a first pair of launched electrodes. The CEW 100 may then apply a third test signal and a fourth test signal to determine a second state of connection of launched electrodes (e.g., as previously discussed). After applying the third test signal and the fourth test signal, the CEW 100 may provide a second pulse of the stimulus signal through a second pair of launched electrodes. The second pair of launched electrodes may be the same as the first pair of launched electrodes. The second pair of launched electrodes may be different from the first pair of launched electrodes (e.g., completely different, at least one electrode of the pair different, etc.). The first pair of launched electrodes may be based on the first state of connection (e.g., the first pair may include two electrodes coupled to the target, based on a determined electrode spread, etc.). The second pair of launched electrodes may be based on the second state of connection and/or the first state of connection (e.g., the first pair may include two electrodes coupled to the target, based on a determined electrode spread, etc.).

The CEW 100 (e.g., via a signal generator 145) may be configured to generate and apply a stimulus signal to the target via the electrodes. In various embodiments, the signal generator 145 may generate the stimulus signal at an output terminal of a driver circuit that is associated with an electrode that is determined to be in contact with the target. For example, the CEW 100 may activate the first driver circuit 305 if the first electrode E1 is determined to be in contact with the target and generates the stimulus signal at the first driver terminal HV1. The CEW 100 may also activate a receiving driver circuit associated with another electrode that is determined to be in contact with the target. For example, the CEW 100 may activate the second driver circuit 310 if the second electrode E2 is determined to be in contact with the target. It will be understood that since each driver circuit comprises both a positive switch device (e.g., the first switch device S1 of the first driver circuit 305 and the third switch device S3 of the second driver circuit 310) and a negative switch device (the second switch device S2 of the first driver circuit 305 and the fourth switch device S4 of the second driver circuit 310), each driver circuit may be able to operate as the drive circuit and the receiving circuit.

Embodiments of the present technology allow any pair of electrodes to provide the stimulus signal to the target. For example, the stimulus signal may be delivered through the first electrode E1 and the second electrode E2 via a first electrical connection 705, the stimulus signal may be delivered through the first electrode E1 and the third electrode E3 via a second electrical connection 710, the stimulus signal may be delivered through the first electrode E1 and the fourth electrode E4 via a third electrical connection 730. Likewise, other electrode pairs may provide additional electrical connections, such as a fourth electrical connection 720, a fifth electrical connection 715, and a sixth electrical connection 725.

Generating the stimulus signal at the first driver terminal HV1 comprises charging the first charge storage circuit 360 of the first driver circuit 305 and selectively turning ON the first switch device S1 according to a charge of the first charge storage circuit 360. For example, generating the stimulus signal may comprise charging the first charge storage device C1 of the first driver circuit 305 and selectively turning ON the first switch device S1 according to a charge of the first charge storage device C1. Charging the first charge storage circuit 360 and turning ON the first switch device S1 may comprise enabling the first high enable signal HEN1 and the first low enable signal LEN1 substantially simultaneously at a first time to. For example, the processing circuit 135 may enable the first high enable signal HEN1 and the first low enable signal LEN1. When the first high enable signal HEN1 and the first low enable signal LEN1 are enabled, the first driver module 330 may provide the enabled signals via outputs OUTA and output OUTB. In accordance with the first low enable signal LEN1, the second switch device S2 may be driven from an open state to a closed state (e.g., turned ON). When second switch device S2 is driven in the closed state, the third node N3 may be electrically coupled to second node N2. The third node N3 may be further electrically coupled to ground via ninth resistor R9. Accordingly, a voltage of substantially zero volts may be coupled to the third node N3 via the second switch device S2 in the closed state.

In accordance with the first high enable signal HEN1, the first switch device S1 is driven from an open state to a closed state (e.g., turned ON). The first high enable signal HEN1 may drive the first switch device S1 in the closed state for a period of time starting at the first time to. When the first switch device S1 is driven in the closed state, the first node N1 may be electrically coupled to the third node N3. At the first time to, the current source circuit 300 may be disabled such that a stimulus signal from the current source circuit 300 is not provided to the first node N1. For example, the current source circuit 300 may be disabled according to a control signal selectively provided to the seventh switch device S7. However, because of the voltage difference between the first high enable signal HEN2 and the third node N3 at the first time to, a charge may be stored by the first charge storage circuit. For example, the charge may be stored in charge storage device C1. Providing the first high enable signal HEN1 via output OUTA of the first driver module 330 may comprise providing the first high enable signal HEN1 to the first charge storage circuit. The charge may be stored in the first charge storage circuit according to the first high enable signal HEN1.

Generating the stimulus signal at the first driver terminal HV1 may further comprise turning OFF the second switch device S2 after the first charge storage circuit 360 has been charged at a second time $t_1$. For example, the processing circuit 135 may disable the first low enable signal LEN1 at the second time $t_1$ after the first charge storage device C1 has been charged. The charge according to the first high enable signal HEN1 may be stored in the first charge storage circuit for a period of time between the first time $t_0$ and the second time $t_1$. The current source circuit 300 may remain disabled at the second time $t_1$ such that a stimulus signal is not provided to the first node N1 at the second time $t_1$.

Generating the stimulus signal at the first driver terminal HV1 may further comprise turning OFF the first switch device S1 after the first charge storage circuit 360 has been charged at the second time $t_1$. For example, the processing circuit 135 may disable the first high enable signal HEN1 at the second time $t_1$. Disabling the first high enable signal HEN1 may disable the first high enable signal HEN1 provided via output OUTA. When the first high enable signal HEN1 is disabled at the second time $t_1$, a charge operable to maintain the first switch device S1 in the closed state may be stored in the first charge storage circuit. For example, the charge stored in the first charge storage device C1 prior to the second time $t_1$ may be maintained at a control terminal of the first switch device S1. The first charge storage circuit 360 of the first driver circuit 305 may prevent current from flowing into the first driver module 330 when the first high enable signal HEN1 is disabled. For example, the first diode D1 may prevent current from flowing into the first driver module 330. However, after the first high enable signal HEN1 is disabled, a charge may be maintained at a control terminal of the first switch device S1 by the first charge storage circuit 360 such that the first switch device S1 may remain in a closed state and the first node N1 may be coupled to the third node N3. Electrical circuit devices of the first charge storage circuit 360, such as first charge storage device C1 and first resistor R1, may be configured such that a minimum charge for retaining the first switch device S1 in the closed state may be maintained after the first high enable signal HEN1 is disabled. At the second time $t_1$, charge may begin to discharge via one or more resistive elements (e.g., the first resistor R1), while remaining greater than the minimum charge.

Generating the stimulus signal may further comprise turning ON the fourth switch device S4 at a third time $t_2$. For example, the processing circuit 135 may enable the second low enable signal LEN2 at the third time $t_2$. When the second low enable signal LEN2 is enabled, the second driver module 335 may provide the second low enable signal LEN2 from output OUTB of the second driver module 335. The fourth switch device S4 is driven from an open state into a closed state in accordance with second low enable signal LEN2. When the fourth switch device S4 is driven in the closed state, the fourth node N4 may be electrically coupled to the second node N2. The fourth node N4 may be further electrically coupled to ground via the ninth resistor R9. Accordingly, a voltage of substantially zero volts may be coupled to the fourth node N4 via the fourth switch device S4 in the closed state.

Figure 5:
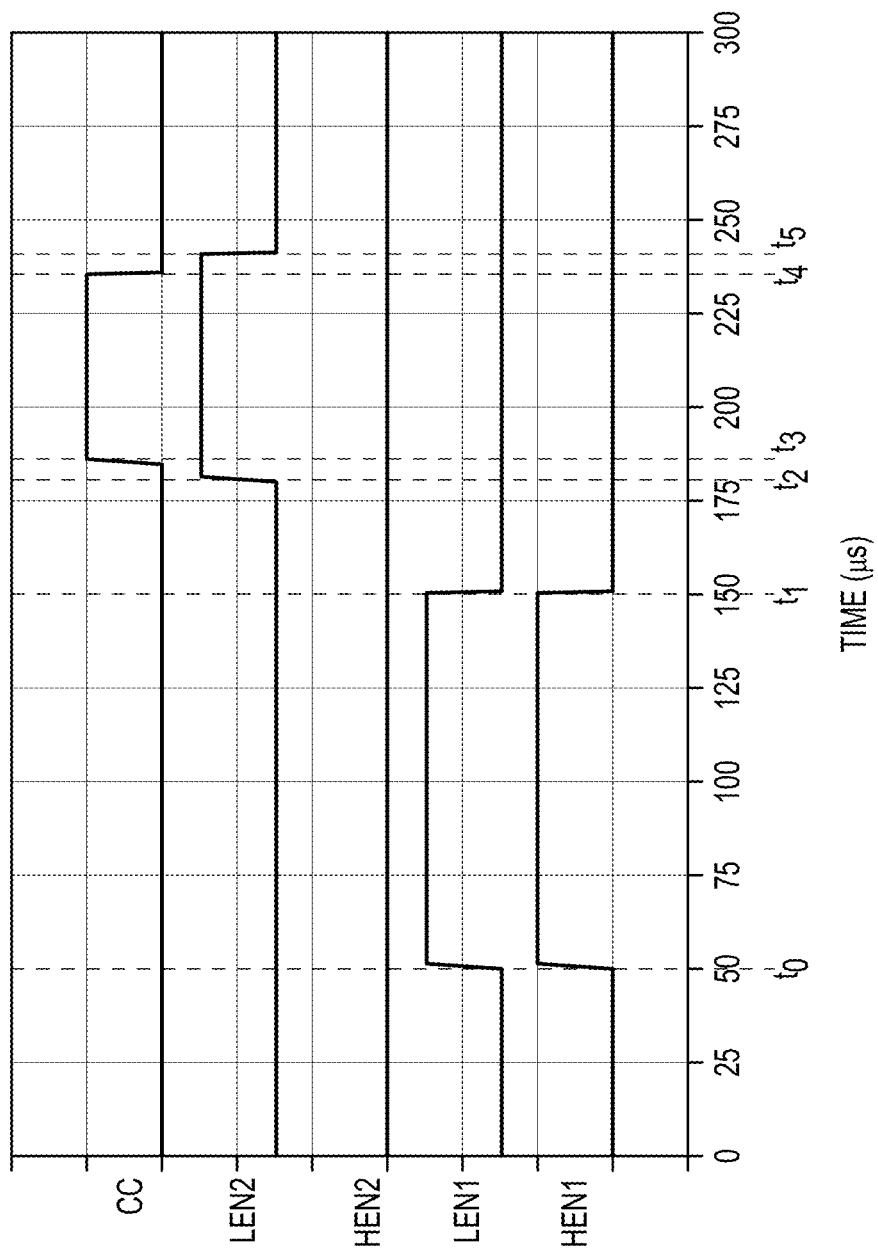
FIG. 5 is a timing diagram for operating the signal generator circuits of FIGS. 3 and 4, in accordance with various embodiments.

After a delay, and at a fourth time $t_3$, the processing circuit 135 may turn ON the current source circuit 300 by enabling the control signal CC_DRIVE (illustrated as "CC" in FIG. 5). The control signal CC_DRIVE may be provided to the seventh switch device S7 to enable the current source circuit 300 at the fourth time $t_3$. At the fourth time $t_3$, current will flow from the current source circuit 300 through a current path comprising the first switch device S1, the first driver terminal HV1, the first electrode E1 (which is associated with the first driver circuit 305), the load (target), the second electrode E2 (which is associated with the second driver circuit 310), the second driver terminal HV2, the fourth switch device S4, the ninth resistor R9, and to the ground. At the fourth time $t_3$, the fourth switch device S4 may have a polarity opposite a polarity of a first switch device S1. For example, the fourth switch device S4 may have a negative polarity comprising a voltage potential of approximately zero volts, and the first switch device S1 may have a positive polarity comprising a voltage potential of approximately 1000 volts. In embodiments, a voltage potential of a switch device may comprise a voltage potential coupled across the switch device and/or provided at a cathode of the switch device. In accordance with the opposite polarities, the current of the stimulus signal may be delivered to the load via the first switch device S1 and the fourth switch device S4.

At the fourth time $t_3$, the first switch device S1 may remain in a closed state according to a charge provided by the first charge storage circuit 360. For example, a charge stored by the first charge storage device C1 may remain above a minimum voltage required to drive the first switch device S1 in the closed state at the fourth time $t_3$. Between the second time ti and the fourth time $t_3$, current may flow across a resistive element (e.g., first resistor R1) of the first charge storage circuit 360, decreasing the charge provided to the control terminal of the first switch device S1. Accordingly, the charge provided by the first charge storage circuit 360 at the fourth time $t_3$ may be less than the charge provided to the first switch device S1 at the second time ti. However, the decreased charge may remain greater than a minimum voltage required to dispose the first switch device S1 in a closed state at the fourth time $t_3$.

At a fifth time $t_4$, the CEW 100 may turn OFF the current source circuit 300. For example, the processing circuit 135 may disable the control signal CC_DRIVE. The processing circuit 135 may disable the control signal CC_DRIVE based on the actual, measured current detected by the current sense circuit 315 and the desired amount of charge delivered to the target. For instance, the desired charge may range from 40 µC to 100 µC. The control signal CC_DRIVE may be enabled for a duration of 25 µs to 120 µs. The first switch device S1 may continue to stay ON for a period of time between the fourth time $t_3$ and the fifth time $t_4$. The stimulus signal from the current source circuit 300 may be provided via the first driver terminal HV1 for the period of time despite a lack of an enable signal being applied to the first driver circuit 305 from processing circuit 135 during the period of time. The first switch device S1 may be passively driven during this period of time.

After processing circuit 135 turns OFF the current source circuit 300, and at a sixth time $t_5$, the processing circuit 135 may turn OFF the fourth switch device S4. The first switch device S1 may continue to stay ON for a period of time between the fifth time $t_4$ and the sixth time $t_5$. The first switch device S1 may continue to stay ON according to a charge provided to the first switch device S1 by the first charge storage circuit 360 of the first driver circuit 305. The first switch device S1 may continue to stay ON for a period of time after the sixth time $t_5$ until the first charge storage circuit 360 is sufficiently discharged to turn OFF the first switch device S1. For example, first switch device S1 may continue to stay ON for a period of time after the sixth time $t_5$ until the first charge storage device C1 is sufficiently discharged to dispose the first switch device in an open state (e.g., turned off). The first switch device S1 may be on for a duration of 300 µs to 1000 µs. Accordingly, the first charge storage circuit 360 may be configured to store the charge for a first period of time greater than a second period of time in which the current source circuit 300 generates a current flow path through the first switch device S1, the first terminal HV1, the load, and the second terminal HV2. Electrical circuit devices of the first charge storage circuit 360, such as at least one capacitor (e.g., first charge storage device C1)

and at least one resistor (e.g., R1) may be configured to store the charge for the first period of time. According to the charge stored in the first charge storage circuit 360, the first switch device S1 may automatically turn OFF after the first period of time.

In embodiments, a second stimulus signal may be provided via the second driver terminal HV2 by switching the enable signals applied to the first driver circuit 305 and the second driver circuit 310 from the processing circuit 135. For example, the second high and low enable signals HEN2 and LEN2 may be simultaneously provided to the third switch device S3 and the fourth switch device S4, the second high and low enable signals HEN2 and LEN2 may then be disabled (e.g., terminated), and the first low enable signal LEN1 may then be provided to the second switch device S2. At this time, the current source circuit 300 may be enabled such that current of the second stimulus signal will flow from the current source circuit 300 through a current flow path comprising the third switch device S3, the second driver terminal HV2, the second electrode E2 (which is associated with the second driver circuit 310), the load (target), the first electrode E1 (which is associated with the first driver circuit 305), the first driver terminal HV1, the second switch device S2, the ninth resistor R9, and to the ground. Accordingly, a same switch device (e.g., second switch device S2 or fourth switch device S4) may be used to provide both a first polarity of one pulse of a stimulus signal and a second, opposite polarity of another, different pulse of the stimulus signal. A same current source circuit 300 may be configured to provide each pulse of stimulus signal across different pairs of electrodes of a plurality of electrodes deployed from the CEW 100.

In example embodiments, a signal generator circuit may be provided, the circuit comprising: a current source circuit comprising one of: a charge storage device, a high-side driver module, and a transistor; a first driver circuit connected to the current source circuit at a first node and comprising: a first switch device connected in series with a second switch device at a second node; and a first charge storage device connected between the first and second switch devices; and a second driver circuit connected to the current source circuit at the first node and comprising:
  a third switch device connected in series with a fourth switch device at a third node; and
  a second charge storage device connected between the third and fourth switch devices.

In one or more of the example embodiments recited above, the signal generator circuit may further comprise: a first output terminal connected at the second node; and a second output terminal connected at the third node.

In one or more of the example embodiments recited above, each of the first, second, third, and fourth switch devices may comprise a metal oxide silicon field effect transistor.

In one or more of the example embodiments recited above, each of the first, second, third, and fourth switch devices may comprise a silicon controlled rectifier.

In one or more of the example embodiments recited above, each of the first and third switch devices comprise a metal oxide silicon field effect transistor; and each of the second and fourth switch devices may comprise a silicon controlled rectifier.

In one or more of the example embodiments recited above, the second switch device and the fourth switch device may be connected to each other at a fourth node.

In one or more of the example embodiments recited above, the signal generator circuit may further comprise a current sense circuit connected to the first and second driver circuits at the fourth node.

In one or more of the example embodiments recited above, the first driver circuit may be responsive to a first control signal and a second control signal; the second driver circuit may be responsive to a third control signal and a fourth control signal; and the current source circuit may be responsive to a fifth control signal.

In one or more of the example embodiments recited above, the first driver circuit may comprise a first diode connected to a first terminal of the first charge storage device; and the second driver circuit may comprise a second diode connected to a first terminal of the second charge storage device.

In example embodiments, a method for operating a conducted electrical weapon is provided, the method comprising: generating a stimulus signal at a first terminal comprising:
  charging a charge storage device; selectively turning on a first switch device according to a charge of the charge storage device; selectively turning off a second switch device according to the charge of the charge storage device, wherein the first and second switch devices are connected in series with each other and connected to the first terminal; and
  selectively turning on a third switch device having a polarity opposite that of the first switch device, wherein the third switch device is connected to a second terminal and connected in parallel with the first and second switch devices; and flowing current through a current path comprising the first switch device, the first terminal, the second terminal, and the third switch device according to a first control signal and the charge of the charge storage device.

In one or more of the example embodiments recited above, charging the charge storage device and turning on the first switch device may comprise enabling a second control signal and a third control signal substantially simultaneously.

In one or more of the example embodiments recited above, selectively turning off the second switch device may comprise disabling the second and third control signals substantially simultaneously.

In one or more of the example embodiments recited above, flowing current through the current path may comprise discharging the charge storage device.

In one or more of the example embodiments recited above, the method may further comprise: selectively turning off the third switch device; and turning off the first switch according to the charge of the charge storage device.

In example embodiments, a conducted electrical weapon (CEW) is provided, comprising: at least three electrodes configured to launch toward a target in response to activation of a trigger of the CEW; a signal generator circuit electrically connected to the electrodes and responsive to the activation of the trigger of the CEW, and comprising: a current source circuit configured to generate a constant current; a first driver circuit connected to the current source circuit at a first node and comprising: a first switch device connected in series with a second switch device at a second node; a first charge storage device connected between the first and second switch devices; and a first terminal connected at the second node and electrically connected to a first electrode from the at least three electrodes; and a second driver circuit connected to: the current source circuit at the first node; and the first driver circuit at a third node; wherein the second driver circuit comprises: a third switch device connected in series with a fourth switch device at a fourth node; a second charge storage device connected between the third and fourth switch devices; and a second terminal connected at the third node and electrically connected to a second electrode from the at least three electrodes; wherein the current source circuit generates a current flow path through the first switch device, the first terminal, the target, the second terminal, and the fourth switch device.

In one or more of the example embodiments recited above, each of the first, second, third, and fourth switch devices may comprise a metal oxide silicon field effect transistor.

In one or more of the example embodiments recited above, each of the first, second, third, and fourth switch devices may comprise a silicon controlled rectifier.

In one or more of the example embodiments recited above, each of the first and third switch devices may comprise a metal oxide silicon field effect transistor; and each of the second and fourth switch devices may comprise a silicon controlled rectifier.

In one or more of the example embodiments recited above, the first driver circuit may comprise a first diode connected to a first terminal of the first charge storage device; and the second driver circuit further may comprise a second diode connected to a first terminal of the second charge storage device.

In one or more of the example embodiments recited above, the first and second switch devices may be responsive to a first control signal and a second control signal; the third and fourth switch devices may be responsive to a third control signal and a fourth control signal; and the current source circuit may be responsive to a fifth control signal.

The foregoing description discusses implementations (e.g., embodiments), which may be changed or modified without departing from the scope of the present disclosure as defined in the claims. Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosures. The scope of the disclosure is accordingly to be limited by nothing other than the appended claims and their legal equivalents, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments," "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments. Furthermore, no element, component, or method step in the present disclosure is intended to be dedicated to the public regardless of whether the element, component, or method step is explicitly recited in the claims. No claim element is intended to invoke 35 U.S.C. 112 (f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. In the specification and claims, the words "a" and "an," are used as indefinite articles meaning "one or more." While for the sake of clarity of description, several specific embodiments have been described, the scope of the invention is intended to be measured by the claims as set forth below.

What is claimed is:

1. A signal generator circuit, comprising:
   a current source circuit comprising one of: a charge storage device, a high-side driver module, and a transistor;
   a first driver circuit connected to the current source circuit at a first node and comprising:
      a first switch device connected in series with a second switch device at a second node; and
      a first charge storage device connected between the first switch device and the second switch device; and
   a second driver circuit connected to the current source circuit at the first node and comprising:
      a third switch device connected in series with a fourth switch device at a third node; and
      a second charge storage device connected between the third switch device and the fourth switch device, wherein when the first switch device is driven in a closed state, the first node is electrically coupled to the second node via the first switch device.

2. The signal generator circuit of claim 1, further comprising:
   a first output terminal connected at the second node; and
   a second output terminal connected at the third node.

3. The signal generator circuit of claim 1, wherein each of the first switch device, the second switch device, the third switch device, and the fourth switch device comprise a metal-oxide-semiconductor field-effect transistor.

4. The signal generator circuit of claim 1, wherein each of the first switch device, the second switch device, the third switch device, and the fourth switch device comprise a silicon controlled rectifier.

5. The signal generator circuit of claim 1, wherein the current source circuit is configured to provide a constant current to the first driver circuit and the second driver circuit.

6. The signal generator circuit of claim 1, wherein the second switch device and the fourth switch device are connected to each other at a fourth node.

7. The signal generator circuit of claim 6, further comprising a current sense circuit connected to the first driver circuit and the second driver circuit at the fourth node.

8. The signal generator circuit of claim 1, wherein:
the first driver circuit is responsive to a first control signal and a second control signal;
the second driver circuit is responsive to a third control signal and a fourth control signal; and
the current source circuit is responsive to a fifth control signal.

9. The signal generator circuit of claim 1, wherein:
the first driver circuit further comprises a first diode connected to a first terminal of the first charge storage device; and
the second driver circuit further comprises a second diode connected to a first terminal of the second charge storage device.

10. A method for operating a conducted electrical weapon, comprising:
generating a stimulus signal at a first terminal comprising:
charging a charge storage device;
selectively turning on a first switch device according to a charge of the charge storage device;
selectively turning off a second switch device according to the charge of the charge storage device, wherein the first switch device and the second switch device are connected in series with each other and connected to the first terminal; and
selectively turning on a third switch device having a polarity opposite that of the first switch device, wherein the third switch device is connected to a second terminal and connected in parallel with the first switch device and the second switch device; and
flowing current through a current path comprising the first switch device, the first terminal, the second terminal, and the third switch device according to a first control signal and the charge of the charge storage device.

11. The method of claim 10, wherein charging the charge storage device and turning on the first switch device comprises enabling a second control signal and a third control signal substantially simultaneously.

12. The method of claim 11, wherein selectively turning off the second switch device comprises disabling the second control signal and the third control signal substantially simultaneously.

13. The method of claim 10, wherein flowing current through the current path comprises discharging the charge storage device.

14. The method of claim 10, further comprising:
selectively turning off the third switch device; and
turning off the first switch device according to the charge of the charge storage device.

15. A conducted electrical weapon (CEW), comprising:
at least three electrodes configured to launch toward a target in response to activation of a trigger of the CEW;
a signal generator circuit electrically connected to the at least three electrodes and responsive to the activation of the trigger of the CEW, and comprising:
a current source circuit configured to generate a constant current;
a first driver circuit connected to the current source circuit at a first node and comprising:
a first switch device connected in series with a second switch device at a second node;
a first charge storage device connected between the first switch device and the second switch device; and
a first terminal connected at the second node and electrically connected to a first electrode from the at least three electrodes; and
a second driver circuit connected to:
the current source circuit at the first node; and
the first driver circuit at a third node;
wherein the second driver circuit comprises:
a third switch device connected in series with a fourth switch device at a fourth node;
a second charge storage device connected between the third switch device and the fourth switch device; and
a second terminal connected at the fourth node and electrically connected to a second electrode from the at least three electrodes;
wherein the current source circuit provides the constant current through a current flow path comprising the first switch device, the first terminal, the target, the second terminal, and the fourth switch device.

16. The conducted electrical weapon of claim 15, wherein the first switch device comprises a metal-oxide-semiconductor field-effect transistor or an insulated gate bipolar transistor.

17. The conducted electrical weapon of claim 15, wherein the first switch device comprises a silicon controlled rectifier.

18. The conducted electrical weapon of claim 15, wherein the first charge storage device is coupled between a control terminal of the first switch device and an output terminal of the first switch device; and
the second charge storage device is coupled between a control terminal of the third switch device and an output terminal of the third switch device.

19. The conducted electrical weapon of claim 15, wherein:
the first driver circuit further comprises a first diode connected to a first terminal of the first charge storage device; and
the second driver circuit further comprises a second diode connected to a first terminal of the second charge storage device.

20. The conducted electrical weapon of claim 15, wherein the current source circuit comprises a regulator coupled to the first node.

* * * * *